(12) United States Patent
Smart et al.

(10) Patent No.: US 8,920,981 B2
(45) Date of Patent: *Dec. 30, 2014

(54) LITHIUM ION ELECTROLYTES AND LITHIUM ION CELLS WITH GOOD LOW TEMPERATURE PERFORMANCE

(75) Inventors: Marshall C. Smart, Studio City, CA (US); Ratnakumar V. Bugga, Arcadia, CA (US)

(73) Assignee: California Institute of Technology, Pasadena, CA (US)

(*) Notice: Subject to any disclaimer, the term of this patent is extended or adjusted under 35 U.S.C. 154(b) by 605 days.

This patent is subject to a terminal disclaimer.

(21) Appl. No.: 12/419,473

(22) Filed: Apr. 7, 2009

(65) Prior Publication Data

US 2009/0253046 A1 Oct. 8, 2009

Related U.S. Application Data

(60) Provisional application No. 61/123,441, filed on Apr. 8, 2008.

(51) Int. Cl.
*H01M 6/16* (2006.01)
(Continued)

(52) U.S. Cl.
CPC .... *H01M 10/0569* (2013.01); *H01M 2004/027* (2013.01); *Y02E 60/122* (2013.01); *H01M 4/485* (2013.01); *H01M 2004/028* (2013.01); *H01M 4/131* (2013.01); *H01M 6/164* (2013.01); *H01M 6/166* (2013.01); *H01M 10/0568* (2013.01); *H01M 2300/004* (2013.01)
USPC ........ 429/332; 429/330; 429/326; 429/231.8; 429/231.1; 429/231.3; 252/62.2

(58) Field of Classification Search
CPC ... H01M 6/164; H01M 6/166; H01M 10/052; H01M 10/0568; H01M 10/0569; H01M 4/131; H01M 4/485; H01M 4/505; H01M 4/525; H01M 2300/004; H01M 2300/042; H01M 2004/027; H01M 2004/028
USPC ........ 429/330, 332, 326, 231.8, 231.1, 231.3; 252/62.2
See application file for complete search history.

(56) References Cited

U.S. PATENT DOCUMENTS

| | | |
|---|---|---|
| 4,052,539 A | 10/1977 | Shopshire et al. |
| 5,256,504 A | 10/1993 | Okuno et al. |

(Continued)

FOREIGN PATENT DOCUMENTS

| | | |
|---|---|---|
| EP | 0 548 449 | 7/1996 |
| JP | 09-017446 | 1/1997 |

(Continued)

OTHER PUBLICATIONS

Smart et al. ECS Transactions, 2008, vol. 11, Issue 29, p. 99-108 Rechargeable Lithium and Lithium Ion Batteries, 212th Meeting of the Electrochemical Society (ECS Meeting), Washington, DC, US, Oct. 7-12, 2007.*

(Continued)

*Primary Examiner* — Laura Weiner
(74) *Attorney, Agent, or Firm* — Lathrop & Gage LLP

(57) ABSTRACT

There is provided in one embodiment of the invention an electrolyte for use in a lithium ion electrochemical cell. The electrolyte comprises a mixture of an ethylene carbonate (EC), an ethyl methyl carbonate (EMC), an ester cosolvent, and a lithium salt. The ester cosolvent comprises methyl propionate (MP), ethyl propionate (EP), methyl butyrate (MB), ethyl butyrate (EB), propyl butyrate (PB), or butyl butyrate (BB). The electrochemical cell operates in a temperature range of from about −60 degrees Celsius to about 60 degrees Celsius. In another embodiment there is provided a lithium ion electrochemical cell using the electrolyte of the invention.

17 Claims, 36 Drawing Sheets

(51) Int. Cl.
| | |
|---|---|
| H01M 10/0569 | (2010.01) |
| H01M 10/0568 | (2010.01) |
| H01M 4/02 | (2006.01) |
| H01M 4/485 | (2010.01) |
| H01M 4/131 | (2010.01) |

(56) References Cited

U.S. PATENT DOCUMENTS

| | | | |
|---|---|---|---|
| 5,352,548 | A | 10/1994 | Fujimoto et al. |
| 5,478,673 | A | 12/1995 | Funatsu |
| 6,306,540 | B1 | 10/2001 | Hiroi et al. |
| 6,399,255 | B2 | 6/2002 | Herreyre et al. |
| 6,489,055 | B1 | 12/2002 | Ichihashi et al. |
| 6,492,064 | B1 | 12/2002 | Smart et al. |
| 7,722,985 | B2 * | 5/2010 | Siret et al. ............. 429/188 |
| 2002/0009651 | A1 * | 1/2002 | Barker et al. ............ 429/332 |
| 2003/0157413 | A1 | 8/2003 | Chen et al. |
| 2004/0072079 | A1 * | 4/2004 | Hashimoto et al. ....... 429/231.1 |
| 2008/0305401 | A1 * | 12/2008 | Smart et al. .............. 429/326 |
| 2010/0047695 | A1 | 2/2010 | Smart et al. |
| 2010/0062346 | A1 | 3/2010 | Lucht et al. |
| 2012/0007560 | A1 | 1/2012 | Smart et al. |

FOREIGN PATENT DOCUMENTS

| | | | |
|---|---|---|---|
| JP | 9-17446 | * | 1/1997 |
| WO | WO 2008/109802 | | 9/2008 |

OTHER PUBLICATIONS

Smart et al. "Li-ion electrolyte containing ester-co-solvents for wide operating temperature range" ECS Transactions, 2008, vol. 11, Issue 29, p. 99-108 (Rechargeable Lithium and Lithium Ion Batteries).*
Smart, M., et al, "Ester-Based Electrolytes for Low-Temperature Li-Ion Cells," NASA Tech Briefs, NPO-41097, Dec. 1, 2005.
Smart, M., et al, "Mixed-Salt/Ester Electrolytes for Low-Temperature Li+ Cells," NASA Tech Briefs, NPO-42862, Nov. 1, 2006.
Smart, M., et al, "Optimized Carbonate and Ester-Based Li-Ion Electrolytes," NASA Tech Briefs, NPO-44974, Apr. 1, 2008.
Herreyre, S., et al., "New Li-ion electrolytes for low temperature applications," Journal of Power Sources 97-98 (2001) 576-580.
Ohta, A., et al., "Relationship between carbonaceous materials and electrolyte in secondary lithium-ion batteries," Journal of Power Sources 54 (1995) 6-10.
Sazhin, S.V., et al., "Performance of Li-ion cells with new electrolytes conceived for low-temperature applications," Journal of Power Sources 87 (2000) 112-117.
Shiao, H.C., et al., "Low temperature electrolytes for Li-ion PVDF cells," Journal of Power Sources 87 (2000) 167-173.
Smart, M.C., et al., "Use of Organic Esters as Cosolvents in Electrolytes for Lithium-Ion Batteries with Improved Low Temperature Performance," Journal of The Electrochemical Society, 149 (4) A361-A370 (2002).
Smart, M.C., et al., "Li-Ion Electrolytes Containing Ester Co-Solvents for Wide Operating Temperature Range", 212th Meeting of the Electrochemical Society, Washington, DC, Oct. 7-12, 2007.
Smart, M.C., et al., "Assessment of Various Low Temperature Electrolytes in Prototype Li-ion Cells Developed for ESMD Applications", 6th International Energy Conversion Engineering Conference (IECEC), Cleveland, OH, Jul. 28-30, 2008.
Smart, M.C., et al., "Li-Ion Electrolytes Containing Ester Co-Solvents for Wide Operating Temperature Range", ECS Trans. 11, (29) 99 (2008).
Smart, M.C., et al., "Electrolytes for Wide Operating Temperature Range Li-ion Cells", Lithium Mobile Power 2008 Conference, Las Vegas, Nevada, Dec. 8, 2008.
Allen et al. (Sep. 22, 2006) "Low Temperature Performance of Nanophase $Li_4Ti_5O_{12}$," J. Power Sources 159(2):1340-1345.
Campion et al. (2005) "Thermal Decomposition of $LiPF_6$-Based Electrolytes for Lithium-Ion Batteries," J. Electrochem. Soc. 152:A2327-A2334.
Colbow et al. (May 16, 1989) "Structure and Electrochemistry of the Spinel Oxides $LiTi_2O_4$ and $Li_{43}Ti_{53}O_4$," J Power Sources 26(3-4):397-402.
Seel et al. (2000) "Electrochemical Intercalation of $PF_6$ into Graphite," J. Electrochem. Soc. 147(3):892-898.
Smart et al. (Jul. 1996) "Development of Electrolytes for Low Temperature Rechargeable Lithium-ion Cells" Proc. $37^{th}$ Power Sources Conf. 1996: 239-242.
Smart et al. (Jan. 1, 2000) "Update on Electrolytes for Low-Temperature Lithium Cells" NASA Tech Briefs 24(1):56.
Smart et al. (Jun. 1, 2001) "Ethyl Methyl Carbonate as a Cosolvent for Lithium-Ion Cells: A low freezing temperature and low viscosity contribute to low-temperature performance" NASA Tech Briefs 25(6):53.
Smart et al. (Jun. 1, 2001) "Aliphatic Ester Electrolyte Additives for Lithium-Ion Cells: Higher-molecular-weight esters show promise for extending lower temperature limits" NASA Tech Briefs 25(6):53.
Smart et al. (Jan. 1, 2003) "Low-EC-Content Electrolytes for Low Temperature Li-Ion Cells" NASA Tech Briefs 27(1):46.
Smart et al. (Web Release Nov. 17, 2006) "Gel Polymer Electrolyte Lithium-Ion Cells with Improved Low Temperature Performance," J. Power Sources 165(2):535-543.
Smart et al. (Oct. 2009) "Performance Demonstration of MCMB-$LiNiCoO_2$ Cells Containing Electrolytes Designed for Wide Operating Temperature Range," ECS Trans. 25(36):273-282.
Smart et al. (Feb. 1, 2010) "Improved Low Temperature performance of Li-Ion Cells using New Electrolytes" NASA Tech Briefs 34(2):47.
Smart et al. (Jun. 7,2010) "Development of Novel Electrolytes for Use in High Energy Lithium-Ion Batteries with Wide Opening Temperature Range," 2010 DOE Annual Merit Review Washington D.C., http://www1.eere.energy.gov/vehiclesandfuels/pdfs/merit_review_2010/electrochemical_storage/es026_smart_2010_o.pdf accessed Feb. 13, 2012.
Smart et al. (Jun. 16, 2010) "Performance of Wide Operating Temperature Range Electrolytes in Quallion Prototype Li-Ion Cells," $44^{th}$ Power Sources Conference, Las Vegas, NV, pp. 191-194.
Smart et al. (Oct. 13, 2010) "Improved Wide Operating Temperature Range of MCMB-$Li_{1+x}(Co_{1/3}Ni_{1/3}Mn_{1/3})_{1-x}O_2$ Cells with Methyl Butyrate-Based Electrolytes," Abstract 580, $218^{th}$ Meeting of the Electrochemical Society, Las Vegas, NV.
Smart et al. (Oct. 26, 2010) "Lithium-Ion Electrolytes Containing Ester Cosolvents for Improved Low Temperature Performance," J. Electrochem. Soc. 157(12):A1361-A1374.
Smart et al. (May 9, 2011) "Electrolytes for Use in High Energy Lithium-Ion Batteries with Wide Operating Temperature Range," 2011 DOE Annual Merit Review, Washington D.C., http://www1.eere.energy.gov/vehiciesandfuels/pdfs/merit_review_2011/electrochemical_storage/es026_smart_2011_p.pdf accessed Feb. 13, 2012.
Smart et al. (Oct. 1, 2011) "Li-Ion Cells Employing Electrolytes with Methyl Propionate and Ethyl Butyrate Co-Solvents" Nasa Tech. Briefs 35(10):47.
Smart et al. (1999) "Electrolytes for Low Temperature Lithium-Ion Batteries Based on Mixtures of Aliphatic Carbonates," J. Electrochem. Soc. 146:486.
Smart et al. (2003) "Improved Low Temperature Performance of Lithium Ion Cells with Quaternary Carbonate-Based Electrolytes," J. Power Sources. 119-121:349-358.
Smart et al. (Jun. 2001) "Lithium Alkoxide Electrolyte Additives for Lithium-Ion Cells," Nasa Tech Briefs. 25:6 (from JPL New Technology Report NPO-20607).
Smart et al. (Sep. 23, 2011) "Use of Additives to Improve Performance of Methyl Butyrate-Based Lithium-Ion Electrolytes," Nasa Tech Briefs. (New Technology Report NPO-47537).
Smart et al. (Mar. 1, 2013) "Improved Wide Operating Temperature Range of Li-Ion Cells," Nasa Tech Briefs. (New Technology Report NPO-47538).

* cited by examiner

Fig. 30

| CELL NUMBER | CELL ID | CELL WEIGHT (GRAMS) | CELL WEIGHT (kg) | INITIAL VOLTAGE | INITIAL CAPACITY (Ah) | INITIAL WATT HOURS | INITIAL Wh/kg | CALCULATED IMPEDANCE (mOhms) (100% SOC) | CALCULATED IMPEDANCE (mOhms) (75% SOC) | ELECTROLYTE TYPE |
|---|---|---|---|---|---|---|---|---|---|---|
| 7-3-242 | LW242 | 243.41 | 0.2434 | 3.564 | 8.0799 | 29.132 | 119.68 | 16.65 | 15.87 | 1.0 M LiPF$_6$ EC+DEC+DMC (1:1:1 v/v %) |
| 7-3-275 | LW275 | 243.68 | 0.2437 | 3.555 | 7.9548 | 28.714 | 117.84 | 18.49 | 16.17 | 1.0 M LiPF$_6$ EC+DEC+DMC (1:1:1 v/v %) |
| 7-3-256 | LW256 | 242.56 | 0.2426 | 3.566 | 7.8331 | 28.211 | 116.31 | 23.06 | 20.93 | 1.0 M LiPF$_6$ EC+DEC+DMC+EMC (1:1:1:3 v/v %) |
| 7-3-258 | LW258 | 242.01 | 0.2420 | 3.566 | 7.9002 | 28.519 | 117.84 | 18.66 | 16.57 | 1.0 M LiPF$_6$ EC+DEC+DMC+EMC (1:1:1:3 v/v %) |
| 7-3-282 | LW282 | 243.00 | 0.2430 | 3.554 | 7.9092 | 28.534 | 117.42 | 20.75 | 18.27 | 1.0 M LiPF$_6$ EC+DEC+DMC+EMC (1:1:1:3 v/v %) |
| 7-3-266 | LW266 | 241.20 | 0.2412 | 3.563 | 7.9038 | 28.524 | 118.26 | 20.01 | 17.70 | 1.0 M LiPF$_6$ EC+EMC (20:80 v/v %) |
| 7-3-267 | LW267 | 242.25 | 0.2423 | 3.565 | 7.9651 | 28.764 | 118.74 | 17.92 | 18.87 | 1.0 M LiPF$_6$ EC+EMC (20:80 v/v %) |
| 7-3-268 | LW268 | 241.74 | 0.2417 | 3.558 | 7.9632 | 28.744 | 118.91 | 18.57 | 16.48 | 1.0 M LiPF$_6$ EC+EMC (20:80 v/v %) |
| 7-3-358 | LW358 | 243.72 | 0.2437 | 3.565 | 8.0028 | 28.931 | 118.70 | 12.56 | 12.43 | 1.0 M LiPF$_6$ EC+EMC+MP (20:60:20 v/v/v %) |
| 7-3-359 | LW359 | 243.86 | 0.2439 | 3.566 | 7.9938 | 28.900 | 118.51 | 13.04 | 12.60 | 1.0 M LiPF$_6$ EC+EMC+MP (20:60:20 v/v/v %) |
| 7-3-360 | LW360 | 243.72 | 0.2437 | 3.561 | 7.9989 | 28.925 | 118.68 | 12.56 | 12.21 | 1.0 M LiPF$_6$ EC+EMC+MP (20:60:20 v/v/v %) |
| 7-3-361 | LW361 | 243.86 | 0.2439 | 3.566 | 8.0294 | 29.017 | 118.99 | 13.65 | 13.25 | 1.0 M LiPF$_6$ EC+EMC+EP (20:60:20 v/v/v %) |
| 7-3-362 | LW362 | 244.15 | 0.2442 | 3.565 | 8.0020 | 28.923 | 118.46 | 13.47 | 13.12 | 1.0 M LiPF$_6$ EC+EMC+EP (20:60:20 v/v/v %) |
| 7-3-364 | LW364 | 243.57 | 0.2436 | 3.565 | 8.0034 | 28.948 | 118.85 | 11.81 | 11.51 | 1.0 M LiPF$_6$ EC+EMC+EP (20:60:20 v/v/v %) |
| 7-3-365 | LW365 | 243.90 | 0.2439 | 3.567 | 8.0060 | 28.927 | 118.60 | 13.86 | 13.47 | 1.0 M LiPF$_6$ EC+EMC+EB (20:60:20 v/v/v %) |
| 7-3-366 | LW366 | 243.76 | 0.2438 | 3.566 | 8.0042 | 28.923 | 118.65 | 13.95 | 13.56 | 1.0 M LiPF$_6$ EC+EMC+EB (20:60:20 v/v/v %) |
| 7-3-367 | LW367 | 243.34 | 0.2433 | 3.568 | 8.0086 | 28.941 | 118.93 | 13.52 | 13.17 | 1.0 M LiPF$_6$ EC+EMC+EB (20:60:20 v/v/v %) |
| AVERAGE | | 243.16 | 0.24 | 3.56 | 7.97 | 28.80 | 118.43 | 16.03 | 15.07 | |

Fig. 34

| ELECTROLYTE TYPE | CHARGE CAPACITY (Ah) 1st CYCLE | DISCHARGE CAPACITY (Ah) 1st CYCLE | IRREVERSIBLE CAPACITY 1st CYCLE | COULOUMBIC EFFICIENCY (1st CYCLE) | CHARGE CAPACITY (Ah) 5th CYCLE | REVERSIBLE CAPACITY (Ah) 5th CYCLE | CUMMULATIVE IRREVERSIBLE CAPACITY (1st-5th CYCLE) | COULOUMBIC EFFICIENCY (5th CYCLE) |
|---|---|---|---|---|---|---|---|---|
| 1.0 M LiPF6 EC+DEC+DMC (1:1:1 v/v %) | 0.4788 | 0.4106 | 0.068 | 85.75 | 0.4117 | 0.3979 | 0.1313 | 96.65 |
| 1.0 M LiPF6 EC+DEC+DMC+EMC (1:1:1:3 v/v %) | 0.4647 | 0.3884 | 0.076 | 83.58 | 0.3867 | 0.3737 | 0.1352 | 96.64 |
| 1.0 M LiPF6 EC+EMC (20:80 v/v %) | 0.4826 | 0.4132 | 0.069 | 85.62 | 0.4014 | 0.3890 | 0.1259 | 96.90 |
| 1.0 M LiPF6 EC+EMC (20:80 v/v %) | 0.4682 | 0.4044 | 0.064 | 86.39 | 0.4013 | 0.3914 | 0.1136 | 97.53 |
| 1.0 M LiPF6 EC+EMC (20:80 v/v %) | 0.4216 | 0.3334 | 0.088 | 79.08 | 0.3341 | 0.3266 | 0.1241 | 97.76 |
| 1.0 M LiPF6 EC+EMC+MP (20:60:20 v/v %) | 0.50605 | 0.43830 | 0.068 | 86.61 | 0.42906 | 0.42713 | 0.0829 | 99.55 |
| 1.0 M LiPF6 EC+EMC+MP (20:60:20 v/v %) | 0.47926 | 0.40823 | 0.071 | 85.18 | 0.40037 | 0.39305 | 0.1090 | 98.17 |
| 1.0 M LiPF6 EC+EMC+MB (20:60:20 v/v %) | 0.45644 | 0.39104 | 0.065 | 85.67 | 0.39221 | 0.38127 | 0.1162 | 97.21 |
| 1.0 M LiPF6 EC+EMC+EB (20:60:20 v/v %) | 0.49481 | 0.42631 | 0.069 | 86.16 | 0.41093 | 0.40884 | 0.0857 | 99.49 |
| 1.0 M LiPF6 EC+EMC+PB (20:60:20 v/v %) | 0.44553 | 0.38051 | 0.065 | 85.41 | 0.37881 | 0.37173 | 0.0989 | 98.13 |
| 1.0 M LiPF6 EC+EMC+BB (20:60:20 v/v %) | 0.45676 | 0.39613 | 0.061 | 86.73 | 0.39411 | 0.38731 | 0.0948 | 98.27 |

Fig. 35

| | | LA11 | | LA15 | | LA16 | | LS07 | | LS08 | | LA18 | | LA14 | | LA17 | | LS01 | | LS02 | |
|---|---|---|---|---|---|---|---|---|---|---|---|---|---|---|---|---|---|---|---|---|---|
| | | 1.0 M LiPF6 EC+DEC+DMC (1:1:1 v/v%) | | 1.0 M LiPF6 EC+DEC+DMC+EMC (1:1:1:3 v/v%) | | 1.0 M LiPF6 EC+EMC (20:80 v/v%) | | 1.0 M LiPF6 EC+EMC (20:80 v/v%) | | 1.0 M LiPF6 EC+EMC+MP (20:60:20 v/v%) | | 1.0 M LiPF6 EC+EMC+EP (20:60:20 v/v%) | | 1.0 M LiPF6 EC+EMC+MB (20:60:20 v/v%) | | 1.0 M LiPF6 EC+EMC+EB (20:60:20 v/v%) | | 1.0 M LiPF6 EC+EMC+PB (20:60:20 v/v%) | | 1.0 M LiPF6 EC+EMC+BB (20:60:20 v/v%) | |
| ELECTROLYTE TYPE | | | | | | | | | | | | | | | | | | | | | | |
| TEMPERATURE | CURRENT (mA) | CAPACITY (AHR) | PERCENT (%) | CAPACITY (AHR) | PERCENT (%) | CAPACITY (AHR) | PERCENT (%) | CAPACITY (AHR) | PERCENT (%) | CAPACITY (AHR) | PERCENT (%) | CAPACITY (AHR) | PERCENT (%) | CAPACITY (AHR) | PERCENT (%) | CAPACITY (AHR) | PERCENT (%) | CAPACITY (AHR) | PERCENT (%) | CAPACITY (AHR) | PERCENT (%) |
| 23°C | 25 mA | 0.3979 | 100 | 0.3737 | 100 | 0.3890 | 100 | 0.3914 | 100 | 0.4271 | 100 | 0.3930 | 100 | 0.3813 | 100 | 0.4088 | 100 | 0.3717 | 100 | 0.3873 | 100 |
| -20°C | 25 mA | 0.3399 | 85.43 | 0.2867 | 76.72 | 0.3041 | 78.17 | 0.3370 | 86.12 | 0.3706 | 86.76 | 0.3274 | 83.29 | 0.3342 | 87.65 | 0.3434 | 83.99 | 0.3208 | 86.29 | 0.3325 | 85.86 |
| | 50 mA | 0.3272 | 82.24 | 0.1248 | 33.40 | 0.2502 | 64.32 | 0.3206 | 81.92 | 0.3503 | 82.00 | 0.2652 | 67.48 | 0.3185 | 83.54 | 0.2845 | 69.59 | 0.3111 | 83.70 | 0.3166 | 81.74 |
| | 100 mA | 0.2887 | 72.55 | 0.0412 | 11.02 | 0.2294 | 58.97 | 0.3044 | 77.79 | | 0.00 | 0.2513 | 63.93 | 0.2937 | 77.02 | 0.2694 | 65.89 | 0.2946 | 79.26 | 0.2961 | 76.45 |
| | 150 mA | 0.1896 | 47.66 | 0.0457 | 12.23 | 0.2235 | 57.45 | 0.2913 | 74.44 | | 0.00 | 0.2655 | 67.56 | 0.2355 | 61.77 | 0.2686 | 65.71 | 0.2778 | 74.73 | 0.2669 | 68.92 |
| -30°C | 25 mA | 0.2422 | 60.86 | 0.1538 | 41.15 | 0.2479 | 63.73 | 0.3149 | 80.47 | | 0.00 | 0.2658 | 67.62 | 0.2402 | 63.01 | 0.2838 | 69.40 | 0.3056 | 82.21 | 0.3105 | 80.18 |
| | 50 mA | 0.1750 | 43.99 | 0.0449 | 12.00 | 0.2221 | 57.10 | | 0.00 | | 0.00 | 0.2404 | 61.17 | 0.2138 | 56.07 | 0.2540 | 62.12 | 0.2895 | 77.87 | 0.2846 | 73.48 |
| | 100 mA | | 0.00 | | 0.00 | | 0.00 | 0.2804 | 71.64 | | 0.00 | | 0.00 | | 0.00 | | 0.00 | 0.2290 | 61.60 | 0.1279 | 33.03 |
| -40°C | 10 mA | 0.2917 | 73.30 | 0.1749 | 46.81 | 0.2464 | 63.35 | | 0.00 | | 0.00 | 0.2676 | 68.07 | 0.2851 | 74.77 | 0.2723 | 66.60 | 0.2787 | 74.98 | 0.2723 | 70.29 |
| | 25 mA | 0.2659 | 66.82 | 0.2129 | 56.98 | 0.2540 | 65.29 | 0.2961 | 75.65 | 0.3179 | 74.43 | 0.2909 | 74.02 | 0.2931 | 76.87 | 0.2982 | 72.93 | 0.2801 | 75.35 | 0.2769 | 71.49 |
| | 50 mA | 0.0282 | 7.09 | 0.0313 | 8.38 | 0.1296 | 33.32 | 0.2672 | 68.28 | 0.3052 | 71.45 | 0.2023 | 51.46 | 0.2696 | 70.72 | 0.1855 | 45.38 | 0.2400 | 64.55 | 0.1895 | 48.93 |
| | 100 mA | 0.0193 | 4.84 | 0.0446 | 11.93 | 0.0967 | 24.86 | 0.1586 | 40.52 | 0.2677 | 62.68 | 0.2423 | 61.64 | 0.1578 | 41.40 | 0.1024 | 25.05 | 0.0507 | 13.65 | 0.0446 | 11.52 |
| | 150 mA | | 0.00 | | 0.00 | | 0.00 | 0.0585 | 14.95 | | 0.00 | | 0.00 | | 0.00 | | 0.00 | | 0.00 | | 0.00 |
| -50°C | 25 mA | 0.0102 | 2.56 | 0.0327 | 8.75 | 0.0380 | 9.78 | 0.1841 | 47.03 | | 0.00 | 0.1777 | 45.21 | 0.1579 | 41.41 | 0.1513 | 37.00 | 0.2316 | 62.32 | 0.2315 | 59.76 |
| | 50 mA | 0.0001 | 0.02 | 0.0128 | 3.43 | 0.0009 | 0.24 | | 0.00 | | 0.00 | 0.0565 | 14.38 | 0.0272 | 7.13 | 0.0360 | 8.81 | 0.0413 | 11.12 | 0.0329 | 8.49 |
| -60°C | 5 mA | 0.0063 | 1.58 | 0.0433 | 11.59 | 0.1017 | 26.13 | 0.2371 | 60.59 | 0.2456 | 57.51 | 0.2345 | 59.65 | 0.1958 | 51.36 | 0.2431 | 59.46 | 0.2255 | 60.66 | 0.0393 | 10.13 |
| | 10 mA | 0.0000 | 0.01 | 0.0202 | 5.40 | 0.0026 | 0.67 | | 0.00 | 0.1253 | 29.34 | 0.1542 | 39.23 | 0.1264 | 33.14 | 0.1486 | 36.35 | 0.1447 | 38.93 | 0.0309 | 7.98 |
| | 25 mA | 0.0000 | 0.00 | 0.0046 | 1.24 | 0.0000 | 0.01 | | 0.00 | 0.1253 | 29.34 | 0.0230 | 5.86 | 0.0120 | 3.16 | 0.0137 | 3.36 | 0.0086 | 2.32 | 0.0011 | 0.28 |

LITHIUM ION ELECTROLYTES AND LITHIUM ION CELLS WITH GOOD LOW TEMPERATURE PERFORMANCE

CROSS-REFERENCE TO RELATED APPLICATION

This application claims priority of U.S. Provisional Patent Application Ser. No. 61/123,441, filed Apr. 8, 2008, which is incorporated herein by reference in its entirety.

GOVERNMENT INTERESTS

The invention described herein was made in the performance of work under a NASA contract, and is subject to the provisions of Public Law 96-517 (35 U.S.C. 202) in which the Contractor has elected to retain title.

BACKGROUND OF THE INVENTION a. Field of the Invention

The invention relates to electrolytes and organic solvents for electrochemical cells. In particular, the invention relates to lithium ion electrolytes and organic solvents for lithium ion cells.

b. Background Art

Lithium ion cells typically include a carbon (e.g., coke or graphite) anode intercalated with lithium ions to form $Li_xC$; an electrolyte consisting of a lithium salt dissolved in one or more organic solvents; and a cathode made of an electrochemically active material, typically an insertion compound, such as $LiCoO_2$. During cell discharge, lithium ions pass from the carbon anode, through the electrolyte to the cathode, where the ions are taken up with the simultaneous release of electrical energy. During cell recharge, lithium ions are transferred back to the anode, where they reintercalate into the carbon matrix.

Lithium ion rechargeable batteries have the demonstrated characteristics of high energy density, high voltage, and excellent cycle life. Known state-of-the-art lithium ion rechargeable batteries and systems have been demonstrated to operate over a wide range of temperatures (e.g., −30° C. (Celsius) to +40° C.). However, the performance of such known lithium ion rechargeable batteries and systems is limited at temperatures below −30° C., making them unsuitable for many terrestrial and extra-terrestrial applications. Many scheduled NASA missions demand good low temperature battery performance without sacrificing such properties as light weight, high specific energy, long cycle life, and moderate cost. Moreover, such scheduled NASA missions require rechargeable batteries that can operate at low temperatures to satisfy the requirements of various applications, such as landers, rovers, and penetrators. For example, the Mars Exploration Program requires rechargeable batteries capable of delivering several hundred cycles with high specific energy, and the ability to operate over a broad range of temperatures, including the extremely low temperatures on and beneath the surface of Mars. Mars rovers and landers require batteries that can operate at temperatures as low as −40° C. Mars penetrators, which can penetrate deep into the Martian surface, require operation at temperatures less than −60° C. Additional applications may require high specific energy batteries that can operate at temperatures down to −80° C., while still providing adequate performance and stability at ambient temperatures.

To be used on the Mars missions and in low earth orbit (LEO) and geostationary earth orbit (GEO) satellites, as well as in terrestrial applications, lithium ion rechargeable batteries may exhibit high specific energy (60-80 Wh/Kg (Watt hours per Kilogram)) and long cycle life (e.g., >500 cycles).

Known state-of-the-art lithium ion cells typically exhibit limited capacities below −30° C. This may be due to limitations of the electrolyte solutions, which become very viscous and freeze at low temperatures, resulting in poor electrolyte conductivity. In addition, the surface film, such as solid electrolyte interphase (SEI), that forms on the electrodes, can either build up over the course of repeated charge/discharge cycling or become highly resistive at lower temperatures. Ideally, the SEI layer on the carbon anode should be protective toward electrolyte reduction and yet conductive to lithium ions to facilitate lithium ion intercalation, even at low temperatures.

Several factors can influence the low temperature performance of lithium ion cells, including: (a) the physical properties of the electrolyte, such as conductivity (lithium ion mobility in the electrolyte solution), melting point, viscosity, and other physical properties; (b) the electrode type; (c) the nature of the SEI layers that can form on the electrode surfaces; (d) the cell design; and, (e) the electrode thickness, separator porosity and separator wetting properties. Of these factors, the physical properties of the electrolyte typically have the predominant impact upon low temperature performance, as sufficient electrolyte conductivity is typically a condition for good performance at low temperatures. Ideally, a good low temperature performance electrolyte solvent should have a combination of properties such as high dielectric constant, low viscosity, adequate Lewis acid-base coordination behavior, as well as appropriate liquid ranges and salt solubilities in the medium.

Known electrolytes used in state-of-the-art lithium ion cells have typically consisted of binary mixtures of organic solvents, for example, high proportions of ethylene carbonate, propylene carbonate or dimethyl carbonate, within which is dispersed a lithium salt, such as lithium hexafluorophosphate ($LiPF_6$). Examples may include 1.0 M (Molar) $LiPF_6$ in a 50:50 mixture of ethylene carbonate/dimethyl carbonate, or ethylene carbonate/diethyl carbonate. Such electrolytes typically do not perform well at low temperatures because they become highly viscous and/or freeze.

Optimized electrolyte formulations consisting of a ternary, equi-proportion mixture of ethylene carbonate (EC), dimethyl carbonate (DMC), and diethyl carbonate (DEC) were disclosed in U.S. Pat. No. 6,492,064 to Smart et al. In addition, lithium ion cells with a quaternary electrolyte formulation consisting of 1.0 M $LiPF_6$ EC+DEC+DMC+EMC (1:1:1:2 v/v), as well as low EC (ethylene carbonate)-content quaternary solvent blend electrolytes, which have enabled excellent performance down to −50° C., are known. However, such ternary and quaternary electrolyte formulations may not provide good cell rate capability at temperatures below −50° C., primarily due to poor ionic conductivity.

Improved performance with multi-component electrolytes of the following formulation: 1.0 M $LiPF_6$ in ethylene carbonate (EC)+ethyl methyl carbonate (EMC)+X (1:1:8 v/v %) (where X is methyl butyrate (MB), ethyl butyrate (EB), methyl propionate (MP), and ethyl valerate (EV)) are also known. Although such electrolyte formulations do provide good performance at very low temperatures, the high temperature resilience of cells containing such electrolytes may be compromised, primarily due to the use of small quantities of ethylene carbonate and high quantities of the ester component.

The use of methyl formate (MF), methyl acetate (MA), ethyl acetate (EA), ethyl propionate (EP), and ethyl butyrate (EB) in multi-component electrolyte formulations is known. However, although some of these electrolytes provide good low temperature performance, they generally do not result in cells with good rate capability at lower temperatures and do not display good high temperature resilience (e.g., >25° C.).

Higher molecular weight esters, such as ethyl propionate and ethyl butyrate, resulting in both improved low temperature performance and good stability at ambient temperatures, were disclosed in M. C. Smart, B. V. Ratnakumar, S. Surampudi, *J. Electrochem. Soc.,* 149 (4), A361, (2002), where excellent performance was obtained down to −40° C. with electrolytes consisting of the following formulations: a) 1.0 M $LiPF_6$ EC+DEC+DMC+ethyl butyrate (EB) (1:1:1:1 v/v %) and b) 1.0 M $LiPF_6$ EC+DEC+DMC+ethyl propionate (EP) (1:1:1:1 v/v %). However, although electrolytes containing methyl acetate and ethyl acetate (low molecular esters) were shown to result in high conductivity at low temperatures and good cell performance at low temperature initially, their high reactivity toward the anode led to continued cell degradation and poor long term performance.

In addition, ester based co solvents having improved low temperature performance were disclosed in A. Ohta, H. Koshina, H. Okuno, and H. Murai, *J. Power Sources,* 54 (1), 6-10, (1995), where electrolytes consisting of the following formulations were disclosed: a) 1.5 M $LiPF_6$ in EC+DEC+MA (1:2:2), b) 1.5 M $LiPF_6$ in EC+DEC+MP (1:2:2), and c) 1.5 M $LiPF_6$ in EC+DEC+EP (1:2:2). However, the incorporation of a large proportion of diethyl carbonate (DEC) produced undesirable effects upon the surface films of carbon anodes.

In addition, electrolytes containing ethyl acetate (EA) and methyl butyrate (MB) were disclosed in S. Herreyre, O. Huchet, S. Barusseau, F. Perton, J. M. Bodet, and Ph. Biensan, *J. Power Sources,* 97-98, 576 (2001) and in U.S. Pat. No. 6,399,255 to Herreyre et al., where electrolytes consisting of the following formulations were disclosed: a) 1.0 M $LiPF_6$ in EC+DMC+MA, b) 1.0 M $LiPF_6$ in EC+DMC+MB, c) 1.0 M $LiPF_6$ in EC+PC+MB, and d) 1.0 M $LiPF_6$ in EC+DMC+EA (solvent ratios not provided). Good low temperature performance with the methyl butyrate-based electrolyte was disclosed. However, the performance at temperatures below −40° C. was not investigated.

In addition, electrolytes containing methyl acetate and ethyl acetate in ternary mixtures with and without blending with toluene were disclosed in H. C. Shiao, D. Chua, H. P., Lin, S. Slane, and M. Solomon, *J. Power Sources,* 87, 167-173 (2000), in an attempt to obtain improved performance at temperatures as low as −50° C. However, such improved performance at temperatures as low as −50° C. was not shown.

In addition, the performance of electrolyte formulations at low temperatures were disclosed in S. V. Sazhin, M. Y. Khimchenko, Y. N. Tritenichenko, and H. S. Lim, *J. Power Sources,* 87, 112-117 (2000), where electrolytes consisting of the following formulations were disclosed: a) 1.0 M $LiPF_6$ in EC+EMC+EA (30:30:40), b) 1.0 M $LiPF_6$ in EC+DMC+MA (30:35:35), c) 1.0 M $LiPF_6$ in EC+DEC+EP (30:35:35), and d) 1.0 M $LiPF_6$ in EC+EMC+EP (30:30:40). Although good performance of the electrolytes was demonstrated at −20° C., the performance at temperatures below −20° C. was not investigated. However, at very low temperatures (<−40° C.) the high EC (ethylene carbonate)-content (30%) and low proportion of the ester-based component (30-40%) in these formulations was not anticipated to yield good performance.

Accordingly, there is a need for lithium ion electrolytes for use with lithium ion cells with improved low temperature performance over known electrolytes and cells.

SUMMARY OF THE INVENTION

This need for lithium ion electrolytes for use with lithium ion cells with improved low temperature performance is satisfied. None of the known electrolytes and cells provide all of the numerous advantages discussed herein. Unlike known methods and systems, embodiments of the method and system of the disclosure may provide one or more of the following advantages: provide lithium ion ester and carbonate-based blended electrolytes that result in improved discharge performance and rate capability at low temperatures (down to −60° C.); provide improved performance with multi-component electrolytes of various compositions including 1.0 M $LiPF_6$ in ethylene carbonate (EC)+ethyl methyl carbonate (EMC)+X (20:60:20 v/v %) [where X is methyl propionate (MP), ethyl propionate (EP), methyl butyrate (MB), ethyl butyrate (EB), propyl butyrate (PB), and butyl butyrate (BB)]; provide lithium ion electrolytes for use in lithium ion cells capable of delivering over 6 (six) times the amount of capacity delivered by known electrolyte and organic solvents and capable of supporting aggressive rates at low temperatures (−50° C. and −60° C.); and, provide lithium ion electrolytes and lithium ion cells that contain solvent blends of high molecular weight ester cosolvents which inherently possess greater stability and that perform well at very low temperatures. Furthermore, the embodiments of the electrolyte systems of the invention are anticipated to display superior cycle life performance and improved resilience at higher temperatures (e.g., >25° C.), compared to the state-of-the-art low temperature electrolyte systems.

In one embodiment of the invention there is provided an electrolyte for use in a lithium ion electrochemical cell. The electrolyte comprises a mixture of an ethylene carbonate (EC), an ethyl methyl carbonate (EMC), an ester cosolvent, and a lithium salt. The electrochemical cell operates in a temperature range of from about −60 degrees Celsius to about 60 degrees Celsius.

In another embodiment of the invention there is provided a lithium ion electrolyte for use in a lithium ion electrochemical cell. The lithium ion electrolyte comprises a mixture of about 15% to about 40% by volume ethylene carbonate (EC); about 10% to about 60% by volume ethyl methyl carbonate (EMC); about 10% to about 70% by volume ester cosolvent, wherein the ester cosolvent is selected from the group consisting of methyl propionate (MP), ethyl propionate (EP), methyl butyrate (MB), ethyl butyrate (EB), propyl butyrate (PB), and butyl butyrate (BB); and, a lithium salt in a concentration of from about 0.5 Molar to about 1.4 Molar, wherein the lithium salt is selected from the group consisting of lithium hexafluorophosphate ($LiPF_6$), lithium tetrafluoroborate ($LiBF_4$), lithium bis(oxalato)borate (LiBOB), lithium hexafluoroarsenate ($LiAsF_6$), lithium perchlorate ($LiClO_4$), lithium trifluoromethanesulfonate ($LiCF_3SO_3$), and lithium bistrifluoromethanesulfonate sulfonyl imide ($LiN(SO_2CF_3)_2$), and mixtures thereof. The lithium ion electrochemical cell operates in a temperature range of from about −60 degrees Celsius to about 60 degrees Celsius.

In another embodiment of the invention there is provided a lithium ion electrochemical cell. The lithium ion electrochemical cell comprises an anode, a cathode, and an electrolyte interspersed between the anode and the cathode. The electrolyte comprises a mixture of an ethylene carbonate (EC); an ethyl methyl carbonate (EMC); an ester cosolvent selected from the group consisting of methyl propionate (MP), ethyl propionate (EP), methyl butyrate (MB), ethyl butyrate (EB), propyl butyrate (PB), and butyl butyrate (BB);

and, a lithium salt. The electrochemical cell operates in a temperature range of from about −60 degrees Celsius to about 60 degrees Celsius.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 30 is an illustration of a table summary of conditioning cycling of prototype 7 Ah lithium ion cells containing electrolytes according to the invention;

FIG. 34 is an illustration of a table summary of charge-discharge characteristics of experimental lithium ion cells containing electrolytes according to the invention;

FIG. 35 is an illustration of a table summary of discharge performance of experimental lithium ion cells at various low temperatures containing electrolytes according to the invention; and, FIG. 36 is an illustration of a partially exploded view of a lithium ion electrochemical cell constructed according to one embodiment of the invention.

DETAILED DESCRIPTION OF THE INVENTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In one embodiment of the invention there is provided an electrolyte for use in a lithium ion electrochemical cell. The electrochemical cell preferably operates in a temperature range of from about −60 degrees C. (Celsius) to about 60 degrees C. (Celsius). The electrolyte comprises a mixture of an ethylene carbonate (EC). The electrolyte may comprise from about 15% to about 40% by volume ethylene carbonate. Preferably, the electrolyte comprises 20% by volume ethylene carbonate. The electrolyte further comprises an ethyl methyl carbonate (EMC). The electrolyte may comprise from about 10% to about 60% by volume ethyl methyl carbonate. Preferably, the electrolyte comprises 60% by volume ethyl methyl carbonate. The electrolyte further comprises an ester cosolvent. The ester cosolvent may comprise methyl propionate (MP), ethyl propionate (EP), methyl butyrate (MB), ethyl butyrate (EB), propyl butyrate (PB), and butyl butyrate (BB). The electrolyte may comprise from about 10% to about 70% by volume ester cosolvent. Preferably, the electrolyte comprises 20% by volume ester cosolvent. The electrolyte preferably has a 1:3:1 volume mixture of ethylene carbonate, ethyl methyl carbonate, and ester cosolvent. The electrolyte further comprises a lithium salt. The lithium salt may be in a concentration of from about 0.5 Molar to about 1.4 Molar. Preferably, the lithium salt is in a concentration of 1.0 Molar. The lithium salt may comprise lithiumhexafluorophosphate ($LiPF_6$), lithium tetrafluoroborate ($LiBF_4$), lithium bis(oxalato)borate (LiBOB) (or $LiB(C_2O_4)_2$)), lithium hexafluoroarsenate ($LiAsF_6$), lithium perchlorate ($LiClO_4$), lithiumtrifluoromethanesulfonate ($LiCF_3SO_3$), or lithium bistrifluoromethanesulfonate sulfonyl imide ($LiN(SO_2CF_3)_2$), or mixtures thereof, or another suitable lithium salt. The mixtures of the lithium salts may comprise lithium hexafluorophosphate and lithium bis(oxalato)borate, lithium hexafluorophosphate and lithium tetrafluoroborate, or another suitable mixture. Preferably, the electrolyte has a greater concentration of ethyl methyl carbonate than ester cosolvent. Preferably, the electrolyte provides improved cycle life characteristics.

Figure 36:
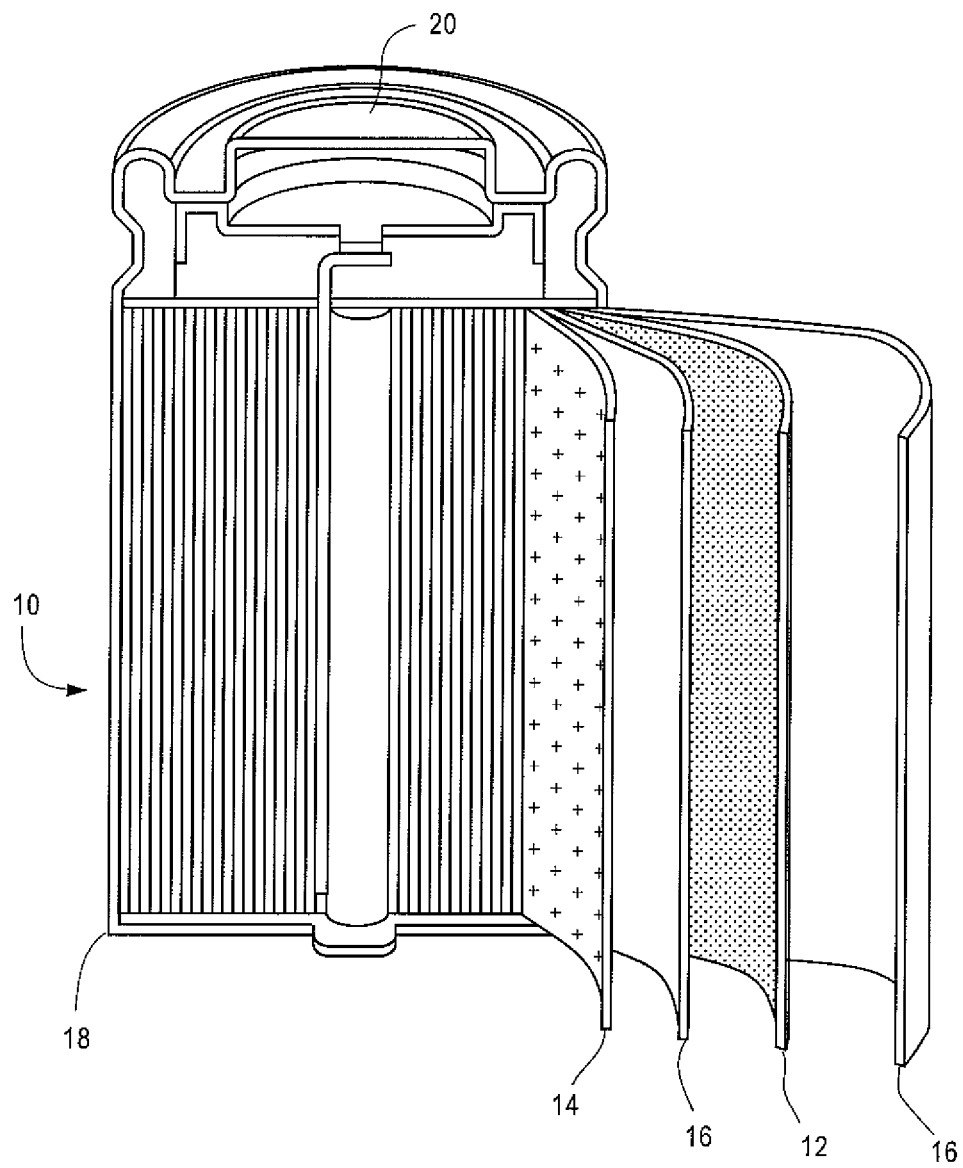

In another embodiment of the invention there is provided a lithium ion electrochemical cell. FIG. 36 is an illustration of a partially exploded view of a lithium ion electrochemical cell 10 constructed according to one embodiment of the invention. The electrolytes and organic solvents described herein may be used in the construction of the improved lithium ion electrochemical cell, characterized by good low temperature performance. The electrochemical cell preferably operates in a temperature range of from about −60 degrees C. (Celsius) to about 60 degrees C. (Celsius). The lithium ion electrochemical cell 10 comprises an anode 12. The anode 12 may comprise mesocarbon microbeads (MCMB) carbon, lithium titanate ($Li_4Ti_5O_{12}$), carbon graphite, coke based carbon, lithium metal, or another suitable material. Carbon is the preferred anode material for lithium ion rechargeable cells due to its low potential versus lithium (of the lithiated compound), excellent reversibility for lithium intercalation/deintercalation reactions, good electronic conductivity, and low cost. Three broad types of carbonaceous anodic materials are known: (a) non-graphitic carbon, e.g., petroleum coke, pitch coke, (b) graphitic carbon, e.g., natural graphite, synthetic graphite, and (c) modified carbon, e.g., mesocarbon microbead carbon material. The lithium ion electrochemical cell further comprises a cathode 14 such as an insertion-type cathode. The cathode 14 may comprise lithium cobalt oxide ($LiCoO_2$), lithium nickel cobalt oxide ($LiNi_{0.8}Co_{0.2}O_2$), lithium manganese oxide ($LiMn_2O_4$), lithium nickel cobalt aluminum oxide ($LiNiCoAlO_2$), lithium metal phosphate ($LiMPO_4$) where the metal may comprise iron, cobalt, manganese, or another suitable metal, lithium nickel cobalt manganese oxide ($LiNiCoMnO_2$), or another suitable material. Suitable cathode materials include transition metal oxides, such as insertion-type metal oxides. In lithium ion cells, the cathode functions as a source of lithium for the intercalation/deintercalation reactions at the anode and the cathode, because of the instability of carbon materials in a lithiated state. Also, it is preferable that the cathode material in lithium ion cells have a high voltage versus lithium (>3.0V) to compensate for voltage losses due to the use of alternate lithium anode materials (having reduced lithium activity) such as lithiated carbon. Lithiated cobalt oxide is a preferred compound because of its ease of preparation and reversibility. Lithiated nickel oxide, lithiated manganese oxide, and other suitable lithiated metal oxides are good alternatives. The anode 12 may be separated from the cathode 14 by one or more electrolyte-permeable separators 16, with the anode/separator(s)/cathode preferably cylindrically rolled up in "jelly roll" fashion and inserted into a can or case 18, which is sealed or closed by a cap 20. The lithium ion electrochemical cell 10 further comprises an electrolyte (not shown), as discussed above, interspersed between the anode and the cathode. Both the anode 12 and the cathode 14 are bathed in the electrolyte (not shown) as discussed above, which is able to pass through the separator(s), allowing ion movement from one electrode to the other. The electrolyte comprises a mixture of an ethylene carbonate (EC); an ethyl methyl carbonate (EMC); an ester cosolvent comprising methyl propionate (MP), ethyl propionate (EP), methyl butyrate (MB), ethyl butyrate (EB), propyl butyrate (PB), butyl butyrate (BB), or another suitable ester cosolvent; and a lithium salt. The lithium salt may comprise lithium hexafluorophosphate ($LiPF_6$), lithium tetrafluoroborate ($LiBF_4$), lithium bis(oxalato oxalate) borate (LiBOB), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), or mixtures thereof, or another suitable lithium salt. Preferably, the electrolyte of the lithium ion electrochemical cell comprises 20% by volume ethylene carbonate, 60% by volume ethyl methyl carbonate, and 20% by volume ester cosolvent. Other features, such as one or more gaskets, anode tabs, safety vents, center pin, and other features known in the art may be included as deemed appropriate, in accordance with known battery design and fabrication.

Examples and Electrochemical Measurements

Experiments were conducted on ester-based electrolyte formulations at temperatures ranging from −60° C. (Celsius) to 60° C. (Celsius), with an emphasis upon improving the rate capability at these temperatures. The following electrolyte solutions were prepared and evaluated: (1) 1.0 M $LiPF_6$ EC+EMC (20:80 v/v %); (2) 1.0 M $LiPF_6$ EC+EMC+MP (20:60:20 v/v %) where MP is methyl propionate; (3) 1.0 M $LiPF_6$ EC+EMC+EP (20:60:20 v/v %) where EP is ethyl propionate; (4) 1.0 M $LiPF_6$ EC+EMC+MB (20:60:20 v/v %) where MB is methyl butyrate; (5) 1.4 M $LiPF_6$ EC+EMC+EB (20:60:20 v/v %) where EB is ethyl butyrate; (6) 1.0 M $LiPF_6$ EC+EMC+PB (20:60:20 v/v %) where PB is propyl butyrate; and, (7) 1.0 M $LiPF_6$ EC+EMC+BB (20:60:20 v/v %) where BB is butyl butyrate. Improved performance was shown with, for example: (1) 1.00 M $LiPF_6$+0.40 $LiBF_4$, and (2) 1.40 M $LiPF_6$ dissolved in EC+EMC+MP (1:1:8 v/v %) and EC+EMC+MB (1:1:8 v/v %) solvent mixtures. The rate capability increased at low temperatures (e.g., −60° C.) with these formulations. It is anticipated that increased salt concentration and the use of mixed salt systems will also improve the low temperature performance characteristics of other solvent blends of carbonates and esters. In the invention the following ester cosolvents were tested: methyl propionate (MP), ethyl propionate (EP), methyl butyrate (MB), ethyl butyrate (EB), propyl butyrate (PB), and butyl butyrate (BB), in multi-component electrolytes of the following composition: 1.0 M $LiPF_6$ in ethylene carbonate (EC)+ethyl methyl carbonate (EMC)+X (20:60:20 v/v/v %) [where X is the ester cosolvent]. These electrolytes were optimized to provide good low temperature performance (down to −60° C.) while still offering reasonable high temperature resilience to produce the desired wide operating temperature systems (−60° C. to 60° C.). This was primarily achieved by fixing the EC-content at 20% and the ester cosolvent content at 20%, in contrast to known systems which have the EC-content at 10% and the ester-content at 80%.

A number of experimental lithium ion cells, consisting of mesocarbon microbeads (MCMB) carbon anodes and $LiNi_{0.8}Co_{0.2}O_2$ cathodes were fabricated. These cells verified and demonstrated the reversibility, low temperature performance, and electrochemical aspects of each electrode as determined from a number of electrochemical characterization techniques. The electrolytes selected for evaluation included the following ester-containing electrolytes and all carbonate-based baseline formulations: (1) 1.0 M $LiPF_6$ EC+EMC (20:80 v/v %) (Baseline); (2) 1.0 M $LiPF_6$ EC+DEC+DMC (1:1:1 v/v %) (Baseline); (3) 1.0 M $LiPF_6$ EC+DEC+DMC+EMC (1:1:1:3 v/v %) (Baseline); (4) 1.0 M $LiPF_6$ EC+EMC+MP (20:60:20 v/v %) where MP is methyl propionate; (5) 1.0 M $LiPF_6$ EC+EMC+EP (20:60:20 v/v %) where EP is ethyl propionate; (6) 1.0 M $LiPF_6$ EC+EMC+MB (20:60:20 v/v %) where MB is methyl propionate; (7) 1.4 M $LiPF_6$ EC+EMC+EB (20:60:20 v/v %) where EB is ethyl butyrate; (8) 1.0 M $LiPF_6$ EC+EMC+PB (20:60:20 v/v %) where PB is propyl butyrate; and, (9) 1.0 M $LiPF_6$ EC+FMC+BB (20:60:20 v/v %) where BB is butyl butyrate. As shown in FIG. 34, a table shows all cells displayed good reversibility at room temperature and minimal reactivity during the formation cycling. FIG. 34 is an illustration of a table summary of charge-discharge (formation) characteristics of experimental lithium ion cells containing EC-based electrolytes with various ester cosolvents in 20% proportion compared with all carbonate-based formulations. Slightly lower cumulative irreversible capacity losses were observed for the majority of the ester-containing electrolytes compared to the all carbonate-based baseline solutions, suggesting that desirable solid electrolyte interphases (SEI) were formed with the formulations. In addition, high coulombic efficiency and comparable irreversible capacity losses were indirectly related to the overall stability and suggested good cycle life characteristics can be obtained. The data showed that the optimized electrolyte solutions containing the ester cosolvents did not display deleterious effects which limit the reversible capacity or hinder the kinetics of the lithium intercalation/deintercalation processes.

Discharge Characteristics

Figure 1:
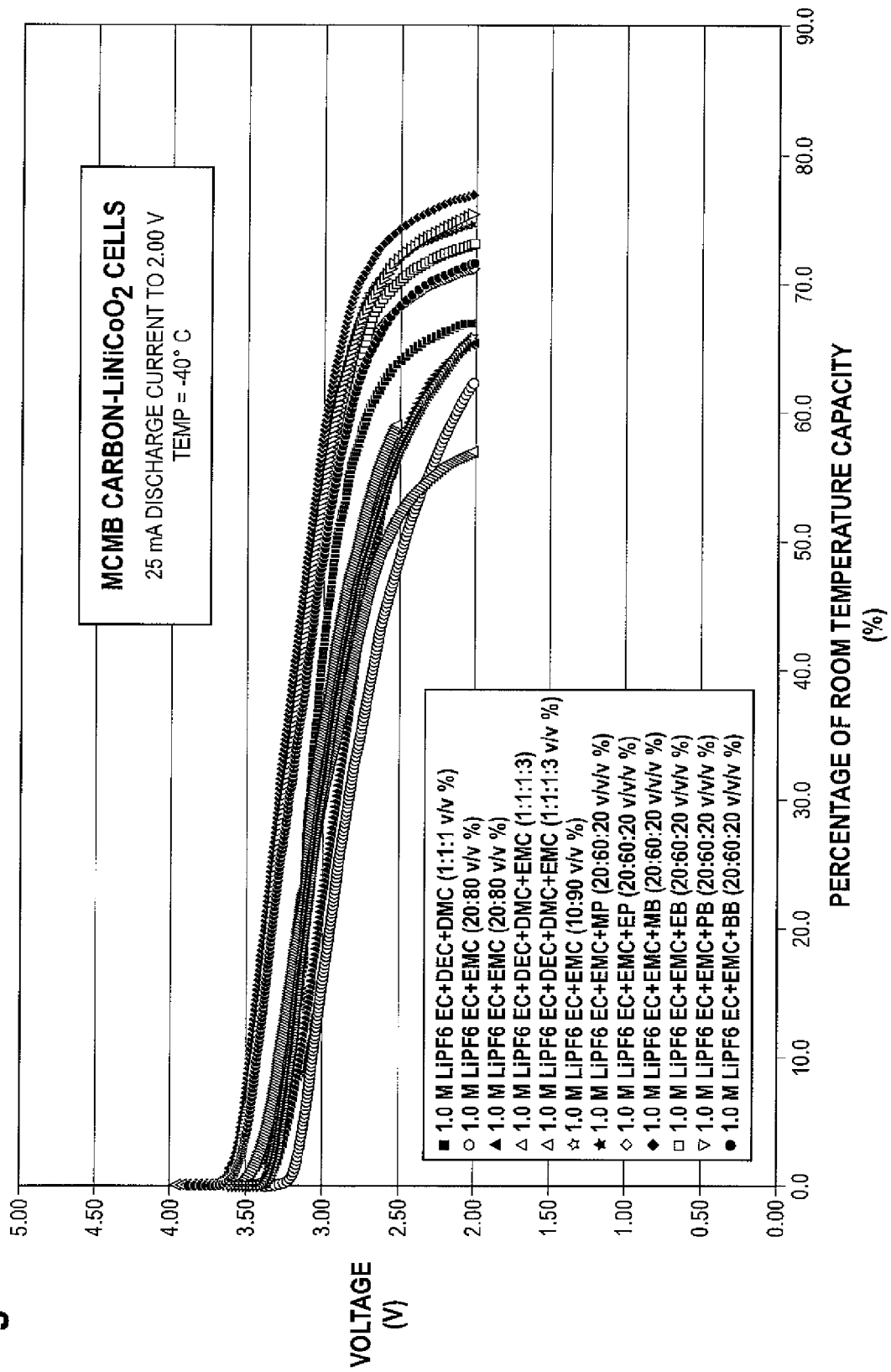
FIG. 1 is an illustration of a graph showing discharge capacity of lithium ion cells at −40° C. (~C/16 rate) containing electrolytes according to the invention.

When the cells were evaluated at low temperature (−40° C.) at moderate rate (~approximately) C/16 discharge rate), as shown in FIG. 1, enhanced low temperature performance was observed with many of the cells containing the ester cosolvents, with 71%-77% of the room temperature capacity being delivered, in contrast to the all carbonate baseline solutions which yielded ~(approximately) 55%-75%. FIG. 1 is an illustration of a graph showing discharge capacity (Ah (Amphour)) of experimental lithium ion cells at −40° C. (~(approximately) C/16 rate) containing electrolytes according to the invention comprising 1.0M $LiPF_6$ EC+EMC+X (20:60:20 v/v %), where X=MP, EP, MB, EB, PB, and BB. The x-axis shows percentage of room temperature capacity (%) and the y-axis shows voltage (V). The graph shows 25 mA discharge current to 2.00 V.

Figure 2:
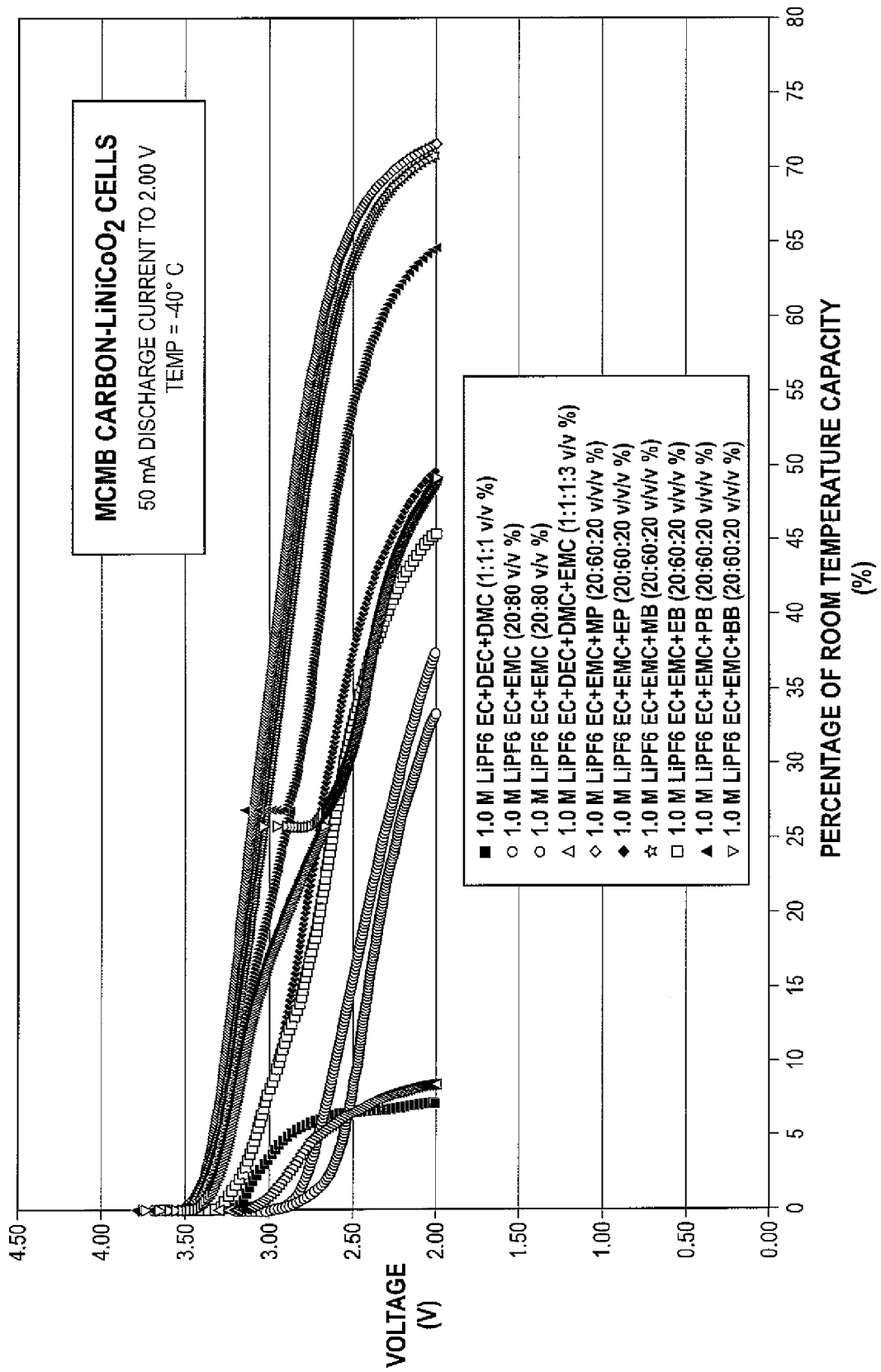
FIG. 2 is an illustration of a graph showing discharge capacity of lithium ion cells at −40° C. (~C/8 rate) containing electrolytes according to the invention.
Figure 3:
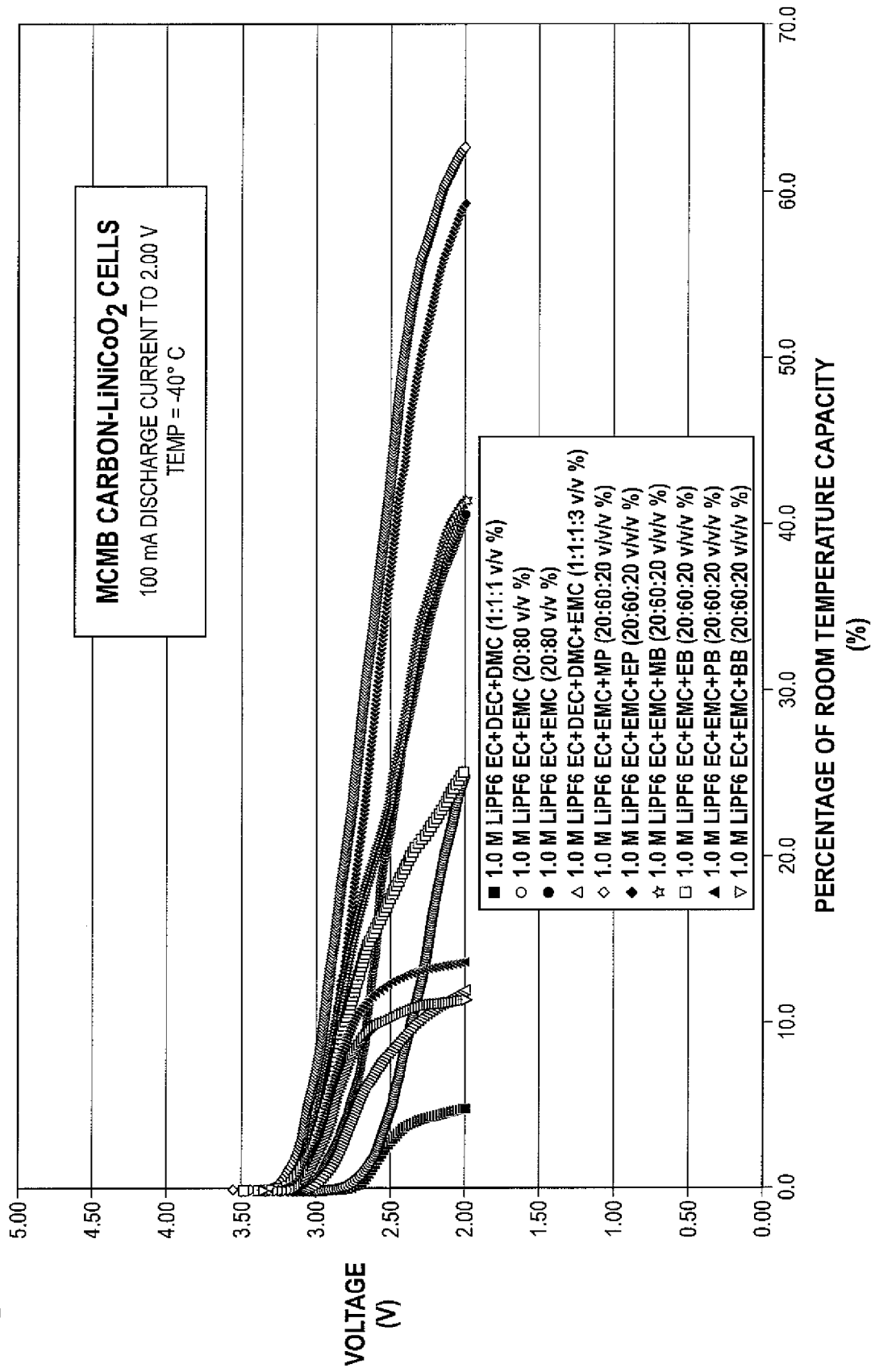
FIG. 3 is an illustration of a graph showing discharge capacity of lithium ion cells at −40° C. (~C/4 rate) containing electrolytes according to the invention.

The benefit of adding the ester cosolvents became more apparent when the cells were evaluated at higher rates at −40° C., as shown in FIG. 2 and FIG. 3, in which ~C/8 and ~C/4 discharge rates were used, respectively. FIG. 2 is an illustration of a graph showing discharge capacity (Ah) of experimental lithium ion cells at −40° C. (~C/8 rate) containing electrolytes according to the invention comprising 1.0M $LiPF_6$ EC+EMC+X (20:60:20 v/v %), where X=MP, EP, MB, EB, PB, and BB. The x-axis shows percentage of room temperature capacity (%) and the y-axis shows voltage (V). The graph shows 50 mA discharge current to 2.00 V. When the cells were discharged using the C/8 rate, the methyl propionate and methyl butyrate-based formulations resulted in the best performance, with ~(approximately) 71% of the room temperature capacity being delivered for both.

FIG. 3 is an illustration of a graph showing discharge capacity (Ah) of experimental lithium ion cells at −40° C. (~C/4 rate) containing electrolytes according to the invention comprising 1.0M $LiPF_6$ EC+EMC+X (20:60:20 v/v %), where X=MP, EP, MB, EB, PB, and BB. The x-axis shows percentage of room temperature capacity (%) and the y-axis shows voltage (V). The graph shows 100 mA discharge current to 2.00 V. When a C/4 discharge rate was used, the best performance was delivered from the following electrolytes in decreasing percent of room temperature capacity: MP (63%)>EP>(62%)>MB (41%).

Figure 4:
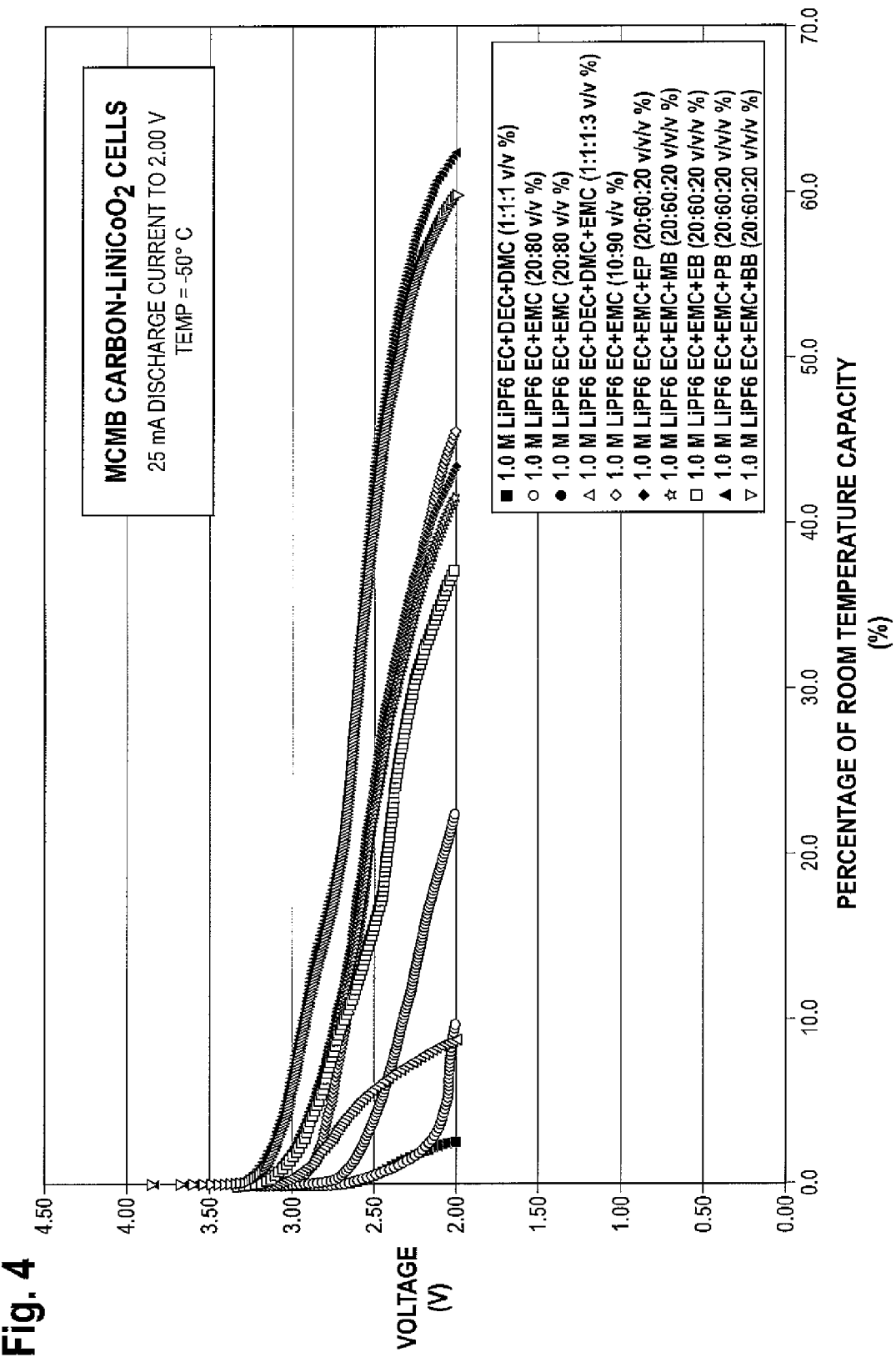
FIG. 4 is an illustration of a graph showing discharge capacity of lithium ion cells at −50° C. (~C/16 rate) containing electrolytes according to the invention.
Figure 5:
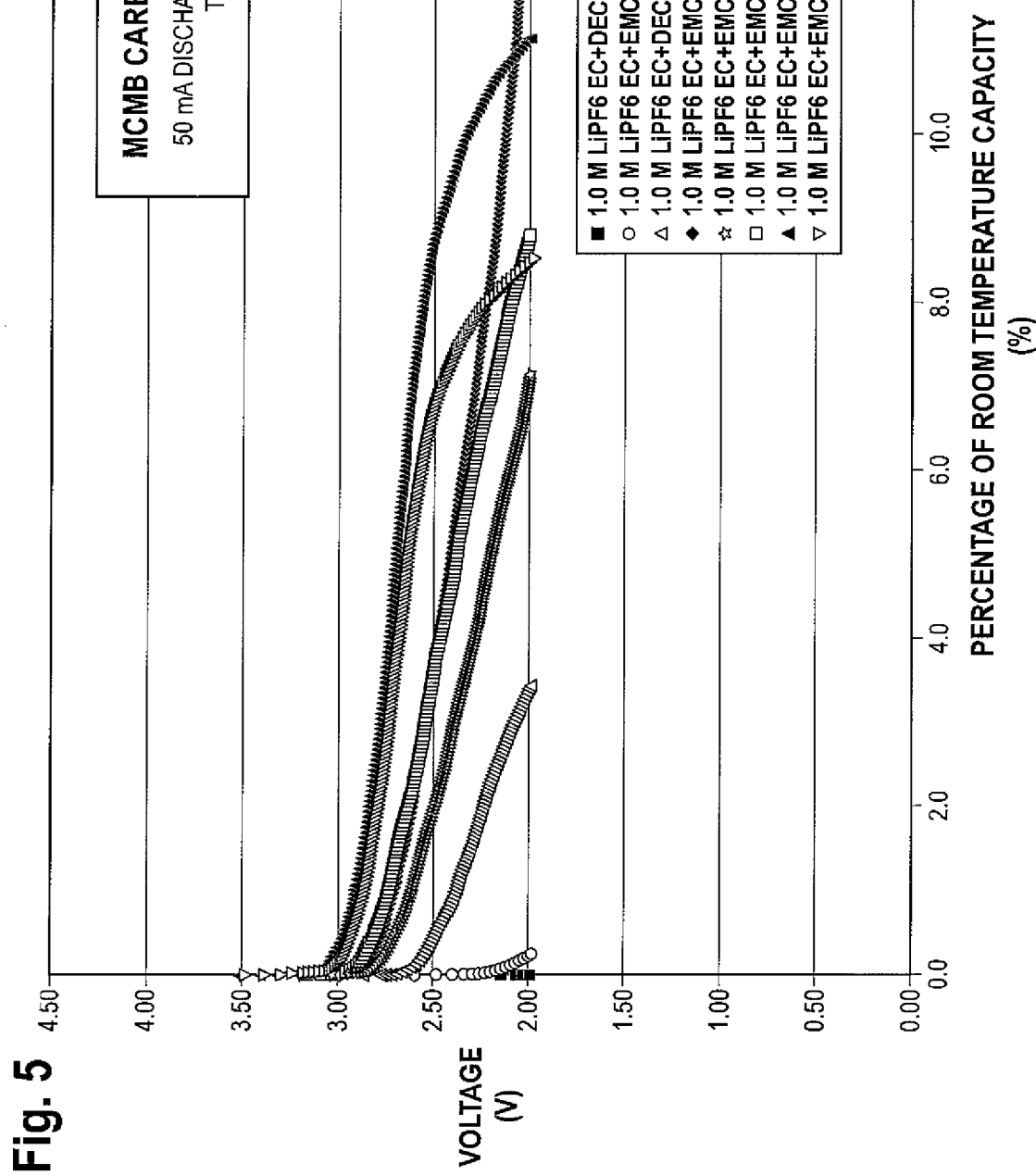
FIG. 5 is an illustration of a graph showing discharge capacity of lithium ion cells at −50° C. (~C/8 rate) containing electrolytes according to the invention.

When the cells described were evaluated at lower temperatures (−50° C.), as shown in FIGS. 4-5, the ester-based formulations again generally outperformed the baseline all carbonate-based solutions. FIG. 4 is an illustration of a graph showing discharge capacity (Ah) of experimental lithium ion cells at −50° C. (~C/16 rate) containing electrolytes according to the invention comprising 1.0M $LiPF_6$ EC+EMC+X (20:60:20 v/v %), where X=MP, EP, MB, EB, PB, and BB. The x-axis shows percentage of room temperature capacity (%) and the y-axis shows voltage (V). The graph shows 25 mA discharge current to 2.00 V. At moderate rates (~C/16), the propyl butyrate (PB) and butyl butyrate (BB) displayed the best performance with 62% and 60% of the room temperature capacity being delivered, respectively.

FIG. 5 is an illustration of a graph showing discharge capacity (Ah) of experimental lithium ion cells at −50° C. (~C/8 rate) containing electrolytes according to the invention comprising 1.0M LiPF$_6$ EC+EMC+X (20:60:20 v/v %), where X=MP, EP, MB, EB, PB, and BB. The x-axis shows percentage of room temperature capacity (%) and the y-axis shows voltage (V). The graph shows 50 mA discharge current to 2.00 V. At higher rates at −50° C. (~C/8 discharge rate), as shown in FIG. 5, the following trend in decreasing percent of room temperature capacity was observed: EP (14%)>PB (11%)>EB (7%)>and MB (7%).

Figure 6:
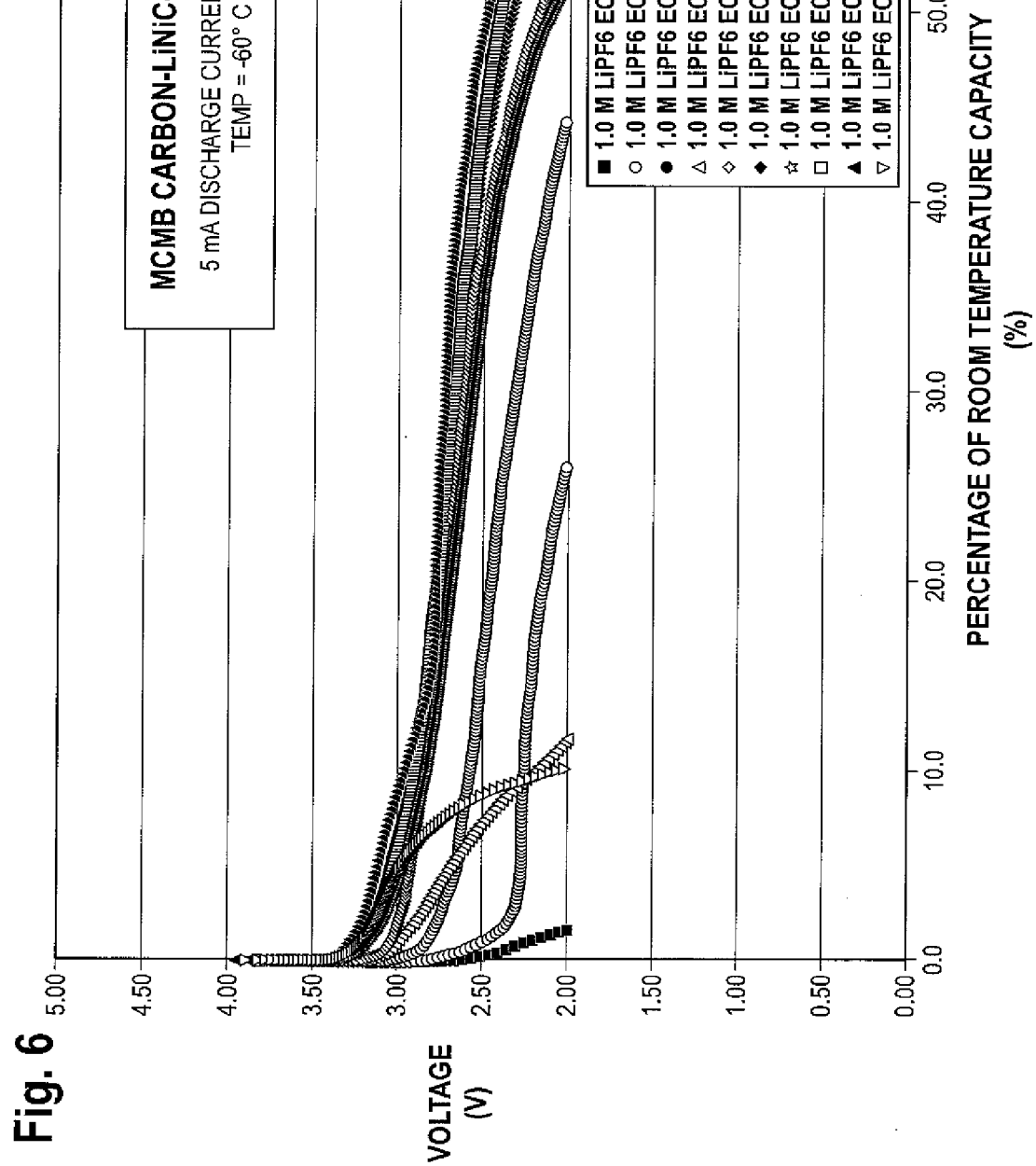
FIG. 6 is an illustration of a graph showing discharge capacity of lithium ion cells at −60° C. (~C/80 rate) containing electrolytes according to the invention.
Figure 7:
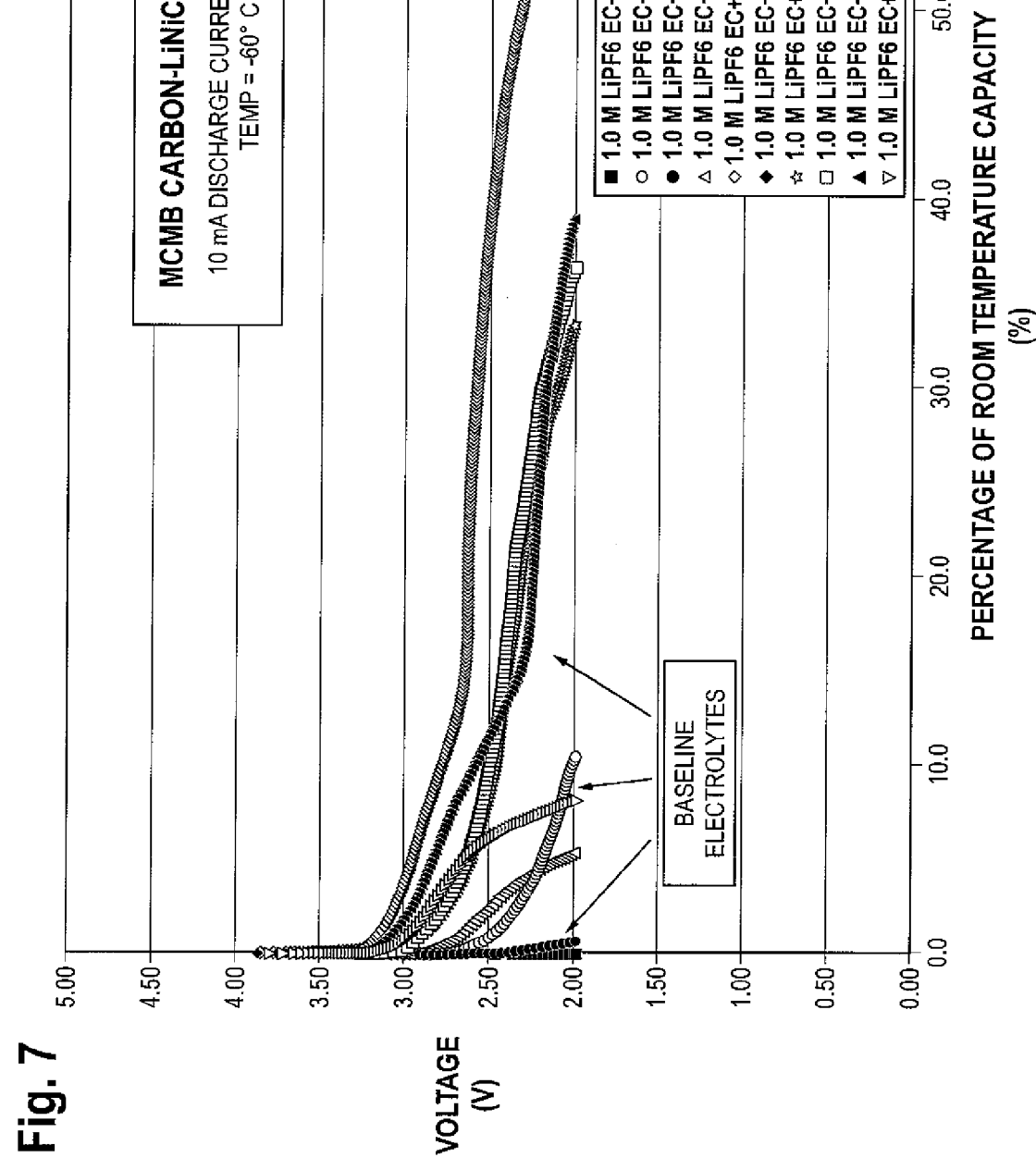
FIG. 7 is an illustration of a graph showing discharge capacity of lithium ion cells at −60° C. (~C/40 rate) containing electrolytes according to the invention.
Figure 8:
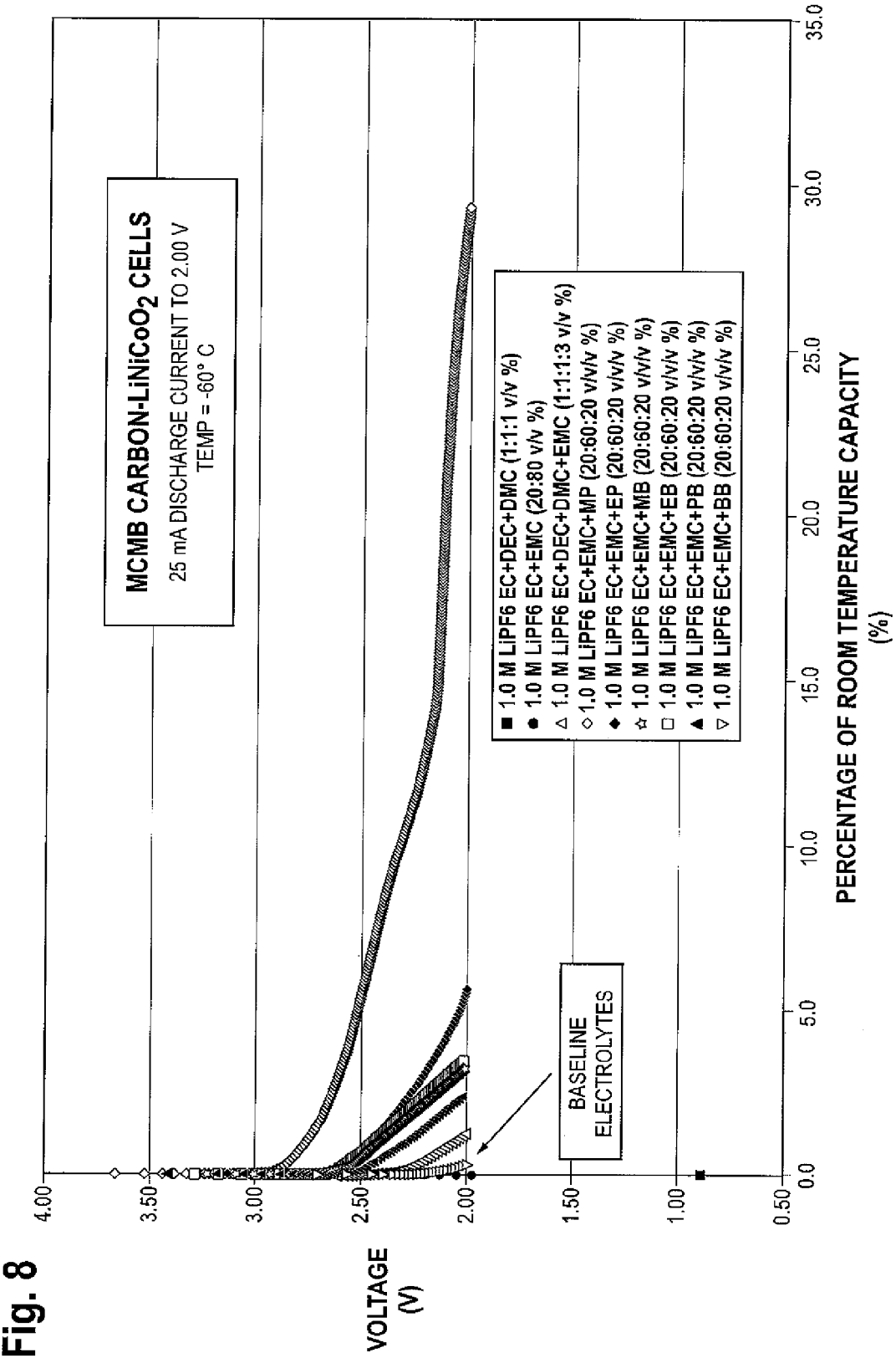
FIG. 8 is an illustration of a graph showing discharge capacity of lithium ion cells at −60° C. (~C/16 rate) containing electrolytes according to the invention.

When the cells described were evaluated at even lower temperatures (−60° C.), as shown in FIGS. 6-8, the ester-based formulations were observed to more dramatically outperform the baseline all carbonate-based solutions. FIG. 6 is an illustration of a graph showing discharge capacity (Ah) of experimental lithium ion cells at −60° C. (~C/80 rate) containing electrolytes according to the invention comprising 1.0M LiPF$_6$ EC+EMC+X (20:60:20 v/v %), where X=MP, EP, MB, EB, PB, and BB. The x-axis shows percentage of room temperature capacity (%) and the y-axis shows voltage (V). The graph shows 5 mA discharge current to 2.00 V. FIG. 7 is an illustration of a graph showing discharge capacity (Ah) of experimental lithium ion cells at −60° C. (~C/40 rate) containing electrolytes according to the invention comprising 1.0M LiPF$_6$ EC+EMC+X (20:60:20 v/v %), where X=MP, EP, MB, EB, PB, and BB. The x-axis shows percentage of room temperature capacity (%) and the y-axis shows voltage (V). The graph shows 10 mA discharge current to 2.00 V. FIG. 8 is an illustration of a graph showing discharge capacity (Ah) of experimental lithium ion cells at −60° C. (~C/16 rate) containing electrolytes according to the invention comprising 1.0M LiPF$_6$ EC+EMC+X (20:60:20 v/v %), where X=MP, EP, MB, EB, PB, and BB. The x-axis shows percentage of room temperature capacity (%) and the y-axis shows voltage (V). The graph shows 25 mA discharge current to 2.00 V. When the cells were discharged using a C/16 rate, the cell containing the methyl propionate delivered the best performance, with ~29% of the room temperature capacity being delivered. Given that methyl propionate-based solution is anticipated to have the highest ionic conductivity at lower temperatures, due to possessing the lowest viscosity of the series of esters, the results were to be expected, provided that the lithium kinetics through the electrode interfaces do not have a stronger influence upon low temperature performance that is often observed with more reactive electrolytes.

As shown in FIG. 35, a table summarizes the low temperature discharge performance of the cells and a number of ester-based formulations displayed good low temperature performance down to −60° C. FIG. 35 is an illustration of a table summary of discharge performance (capacity, Ah) of experimental lithium ion cells at various low temperatures containing electrolytes according to the invention comprising 1.0M LiPF$_6$ EC+EMC+X (20:60:20 v/v %), where X=MP, EP, MB, EB, PB, and BB, and where the cells were charged at room temperature prior to discharge.

These ester containing solutions dramatically outperformed the ternary based all carbonate-based electrolyte (baseline electrolyte used on NASA's MER (Mars Exploration Rover) mission) and outperformed the comparable baseline formulation (EC+EMC (20:80 v/v %)) in many cases. Improvements were expected in the low temperature capability of aerospace quality, large capacity, prototype cells compared to the experimental cells (due to thermal effects and design advantages) when fabricated with these low temperature electrolytes possessing mixed salt systems.

Electrochemical Characteristics

It is believed that the low temperature performance, especially the rate capability, was benefited by the use of these ester-based solutions primarily due to improved mass transfer characteristics in the electrolyte (higher ionic conductivity) and facile kinetics of lithium intercalation/deintercalation at the interface due to favorable film formation behavior at the electrode surfaces. To enhance this understanding the electrochemical characteristics of the systems were assessed using a number of techniques, including Tafel polarization measurements (as shown in FIGS. 9-14), Electrochemical Impedance Spectroscopy (EIS) (as shown in FIGS. 15-29), and linear micro-polarization measurements.

The lithiation/de-lithiation kinetics were determined for the anode and the cathode by conducting Tafel polarization measurements of the MCMB-Li$_x$Ni$_y$Co$_{1-y}$O$_2$ cells in contact with the various electrolytes. The Tafel polarization measurements were generated under potentiodynamic conditions, but at slow scan rates, approximating to steady-state conditions. Thus, the measurements provided insight into the lithiation/de-lithiation kinetics at each electrode. The measurements were conducted on the cells while they were in a full state-of-change (SOC) (open circuit voltage (OCV)=>4.07 V) before and after each storage period. In all of these Tafel plots, there were distinct charge-transfer controlled regimes, where the overpotential increased linearly with log (I). The effect of mass transfer was relatively insignificant, such as kinetic parameters, e.g., exchange current and transfer coefficients. In summary, at the lower temperatures (−40° C. and −60° C.), the kinetics of lithium deintercalation at the anode were most facile for the systems containing ethyl butyrate (EB) and propyl butyrate (PB), outperforming the all carbonate-based solutions, suggesting that in addition to enhanced solution conductivity, the film formation process at the electrode surface was also desirable producing thin, conductive films. Different trends were observed at the cathode, in which the highest lithium intercalation kinetics were observed at low temperature for the cell containing the methyl propionate-based electrolyte.

Figure 9:
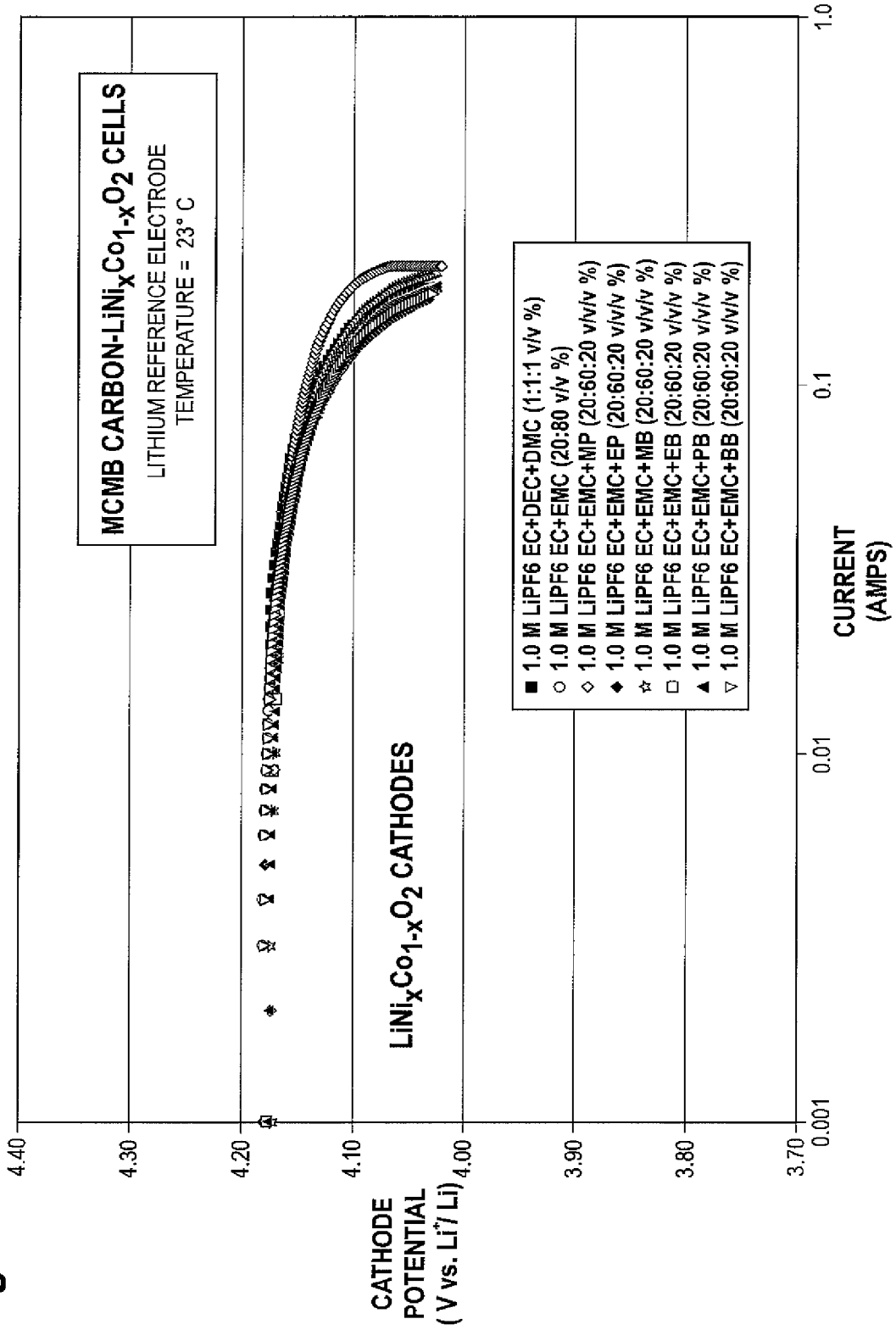
FIG. 9 is an illustration of a graph showing Tafel polarization measurements at 23° C. of $LiNi_xCo_{1-x}O_2$ electrodes from lithium ion cells containing electrolytes according to the invention.

FIG. 9 is an illustration of a graph showing Tafel polarization measurements at 23° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows current (Amps) and the y-axis shows cathode potential (V vs. Li$^+$/Li). The graph shows MCMB carbon-LiNi$_x$Co$_{1-x}$O$_2$ cells.

Figure 10:
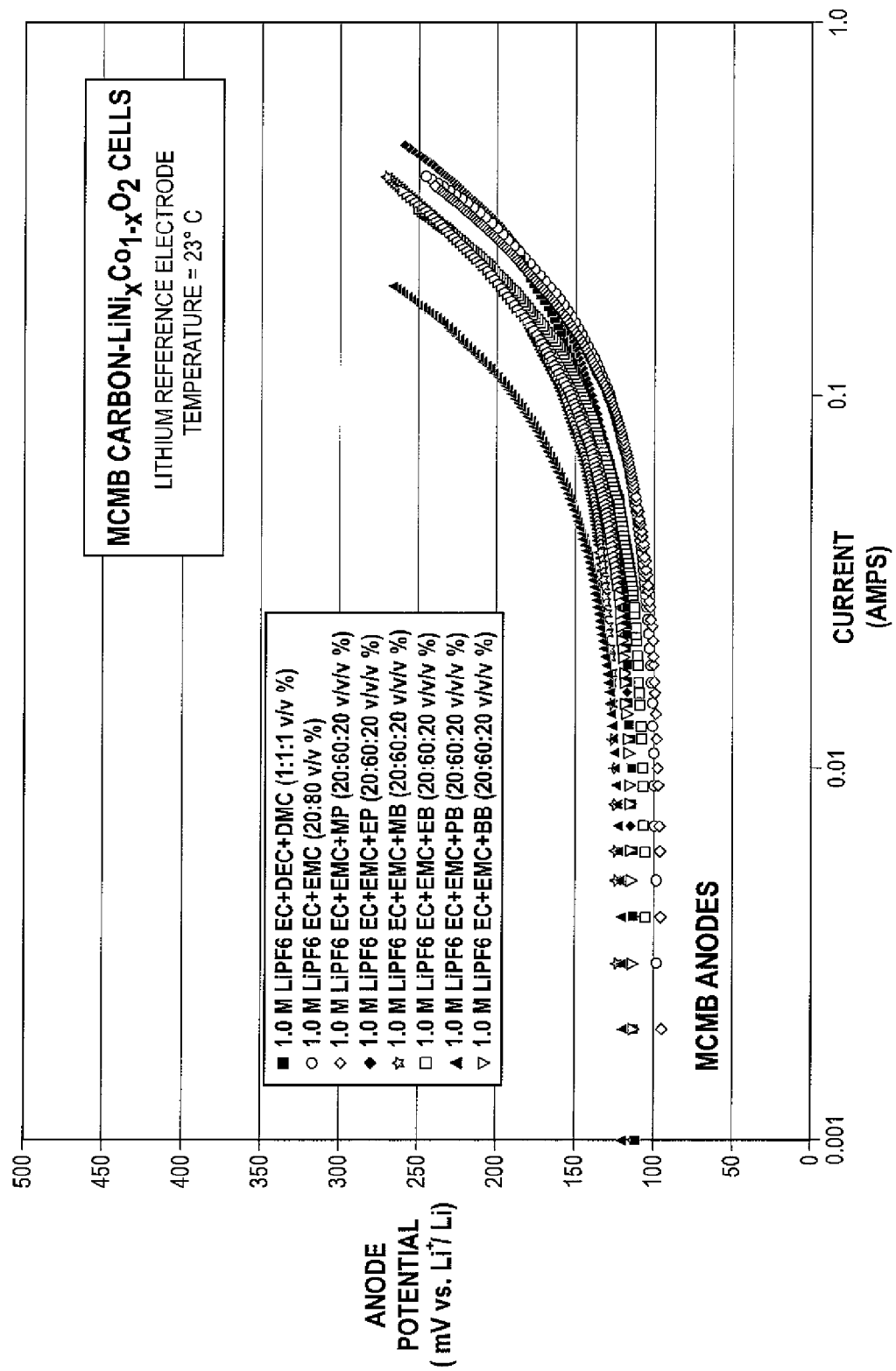
FIG. 10 is an illustration of a graph showing Tafel polarization measurements at 23° C. of MCMB electrodes from lithium ion cells containing electrolytes according to the invention.

FIG. 10 is an illustration of a graph showing Tafel polarization measurements at 23° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows current (Amps) and the y-axis shows anode potential (mV vs. Li$^+$/Li). The graph shows MCMB carbon-LiNi$_x$Co$_{1-x}$O$_2$ cells.

Figure 11:
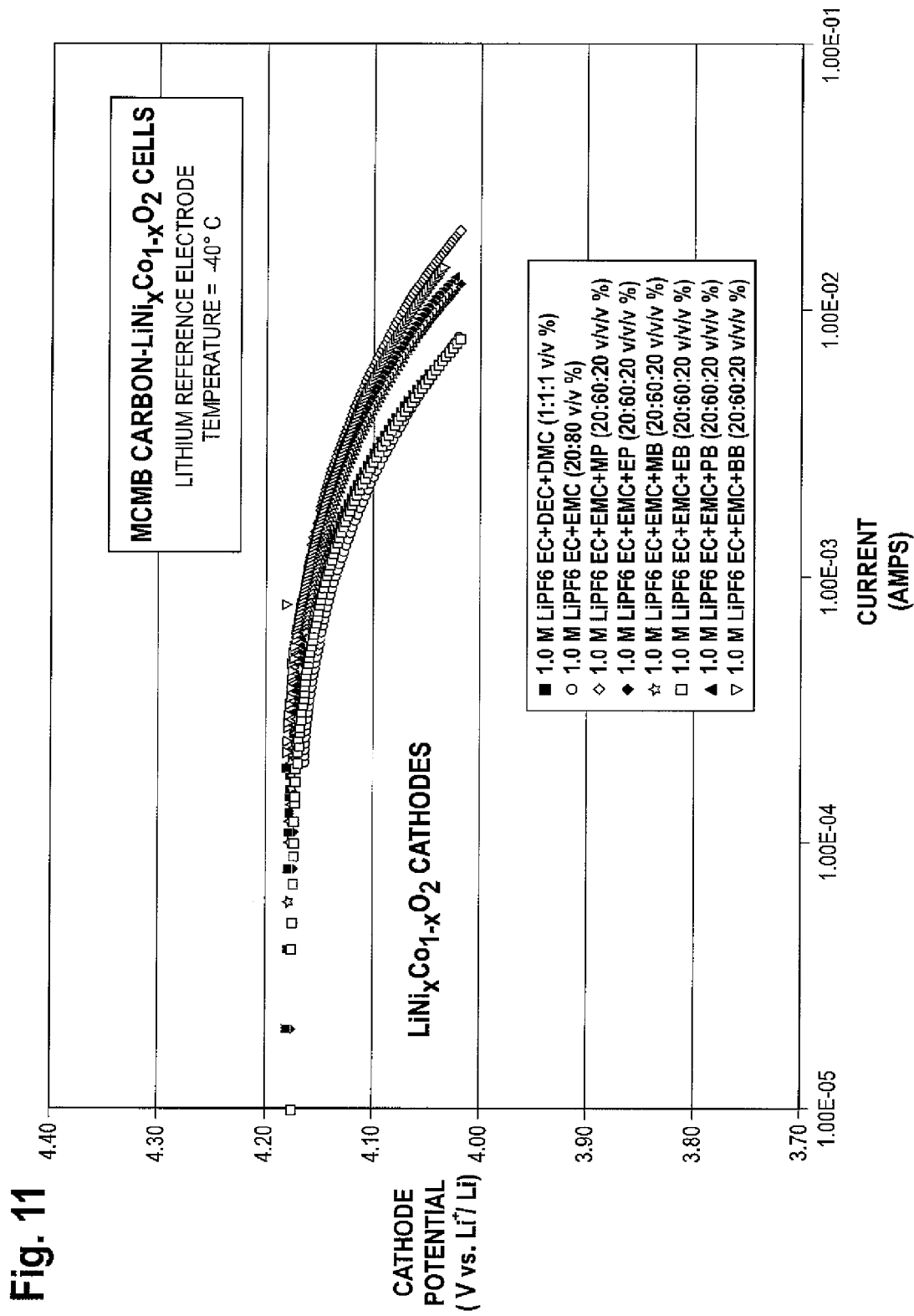
FIG. 11 is an illustration of a graph showing Tafel polarization measurements at −40° C. of $LiNi_xCo_{1-x}O_2$ electrodes from lithium ion cells containing electrolytes according to the invention.

FIG. 11 is an illustration of a graph showing Tafel polarization measurements at −40° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows current (Amps) and the y-axis shows cathode potential (V vs. Li$^+$/Li). The graph shows MCMB carbon-LiNi$_x$Co$_{1-x}$O$_2$ cells.

Figure 12:
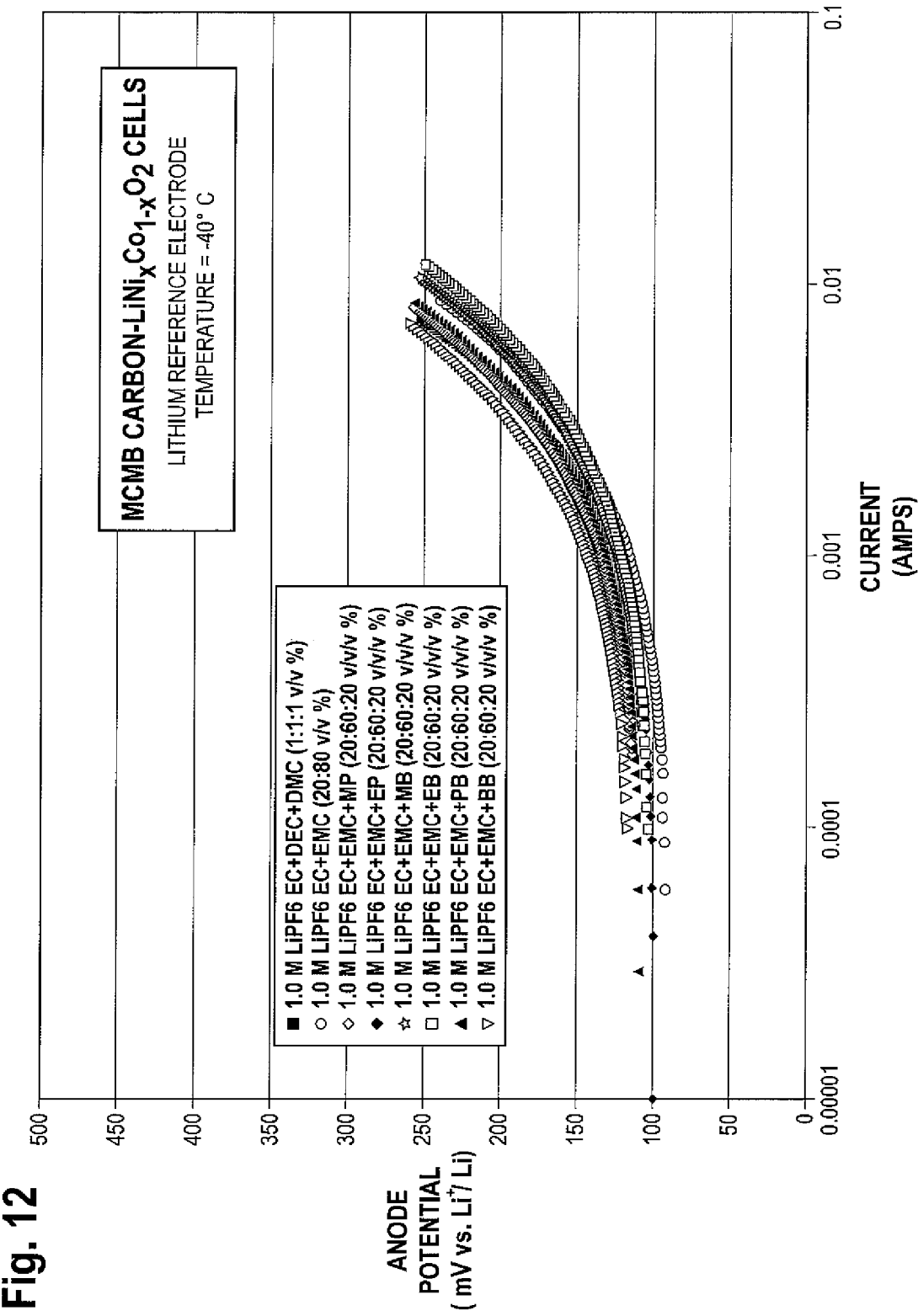
FIG. 12 is an illustration of a graph showing Tafel polarization measurements at −40° C. of MCMB electrodes from lithium ion cells containing electrolytes according to the invention.

FIG. 12 is an illustration of a graph showing Tafel polarization measurements at −40° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows current (Amps) and the y-axis shows anode potential (mV vs. Li$^+$/Li). The graph shows MCMB carbon-LiNi$_x$Co$_{1-x}$O$_2$ cells.

Figure 13:
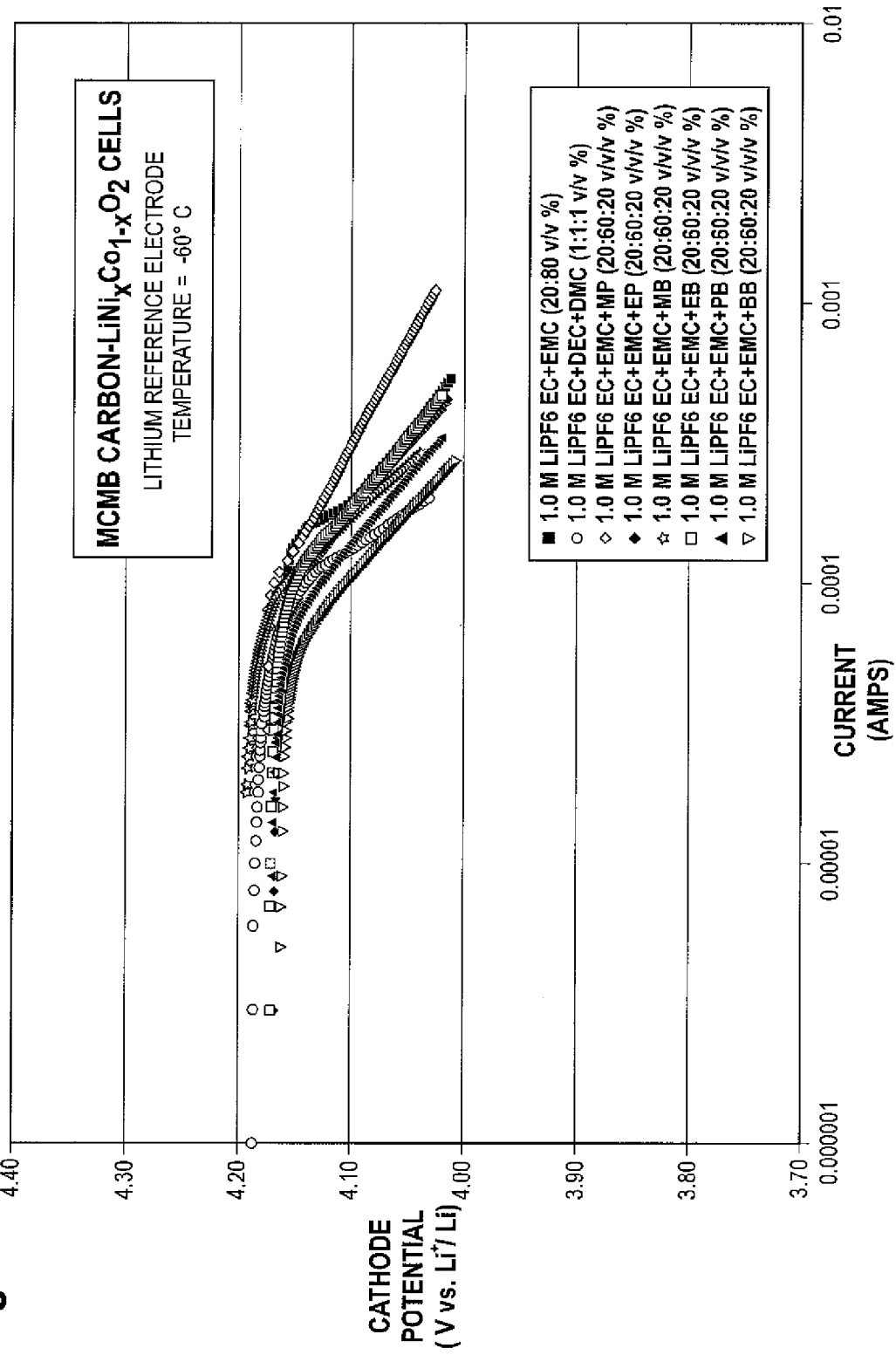
FIG. 13 is an illustration of a graph showing Tafel polarization measurements at −60° C. of $LiNi_xCo_{1-x}O_2$ electrodes from lithium ion cells containing electrolytes according to the invention.

FIG. 13 is an illustration of a graph showing Tafel polarization measurements at −60° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows current (Amps) and the y-axis shows cathode potential (V vs. Li$^+$/Li). The graph shows MCMB carbon —LiNi$_x$Co$_{1-x}$O$_2$ cells.

Figure 14:
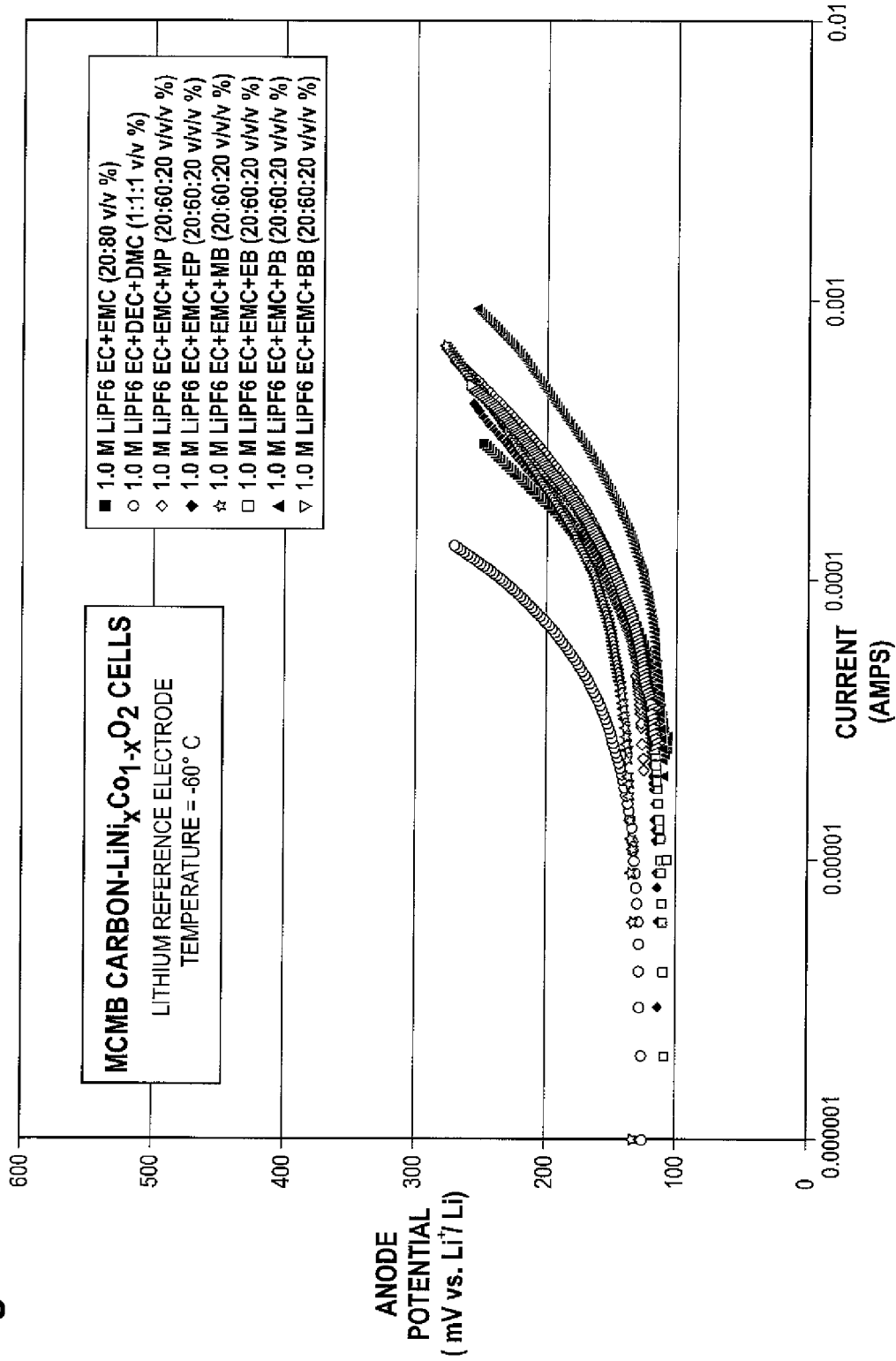
FIG. 14 is an illustration of a graph showing Tafel polarization measurements at −40° C. of MCMB electrodes from lithium ion cells containing electrolytes according to the invention.

FIG. 14 is an illustration of a graph showing Tafel polarization measurements at −40° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows current (Amps) and the y-axis shows anode potential (mV vs. Li$^+$/Li). The graph shows MCMB carbon-LiNi$_x$Co$_{1-x}$O$_2$ cells.

Figure 15:
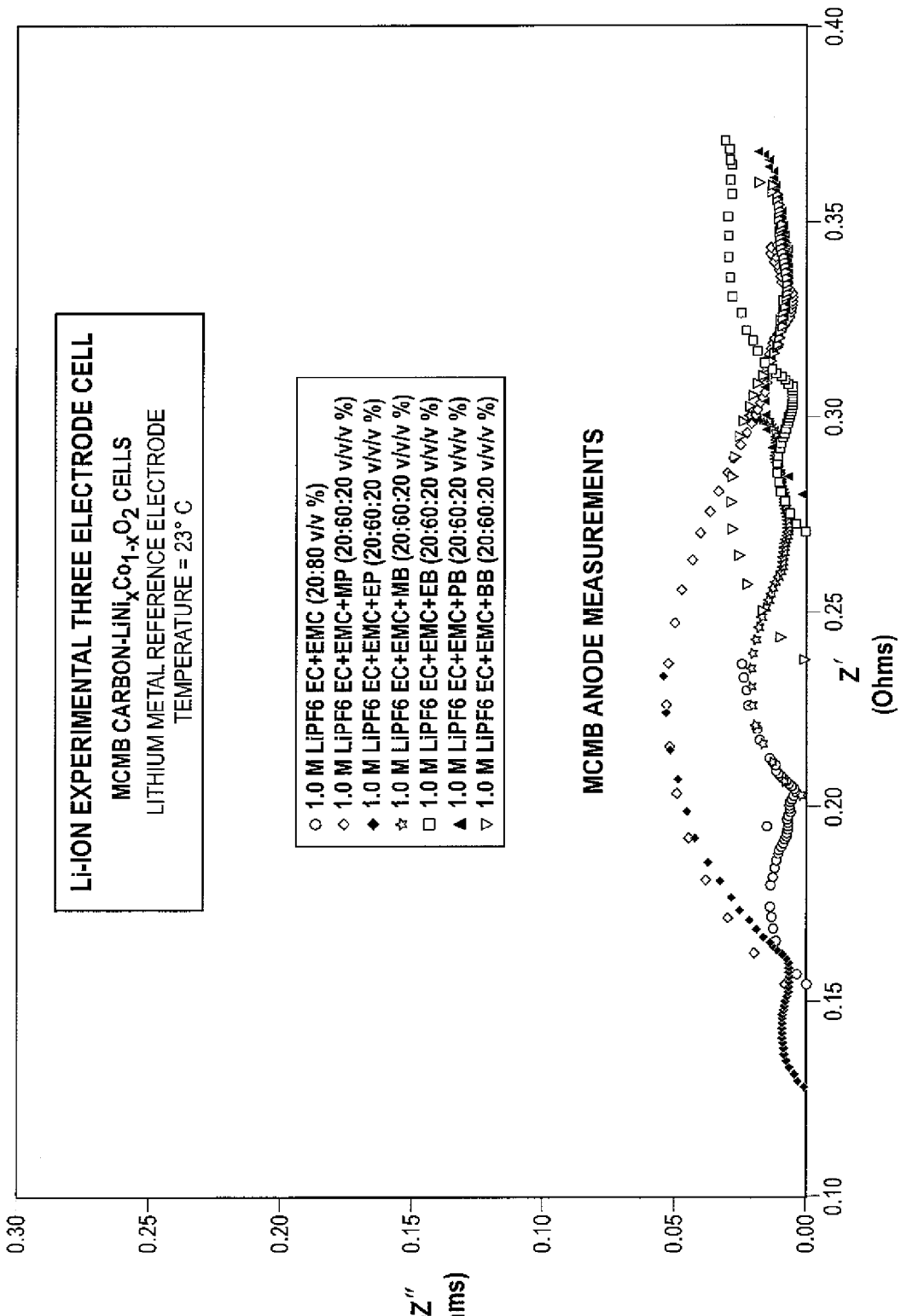
FIG. 15 is an illustration of a graph showing electrochemical impedance spectroscopy (EIS) measurements of 23° C. of MCMB electrodes from lithium ion cells containing electrolytes according to the invention.

FIG. 15 is an illustration of a graph showing electrochemical impedance spectroscopy (EIS) measurements at 23° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 16:
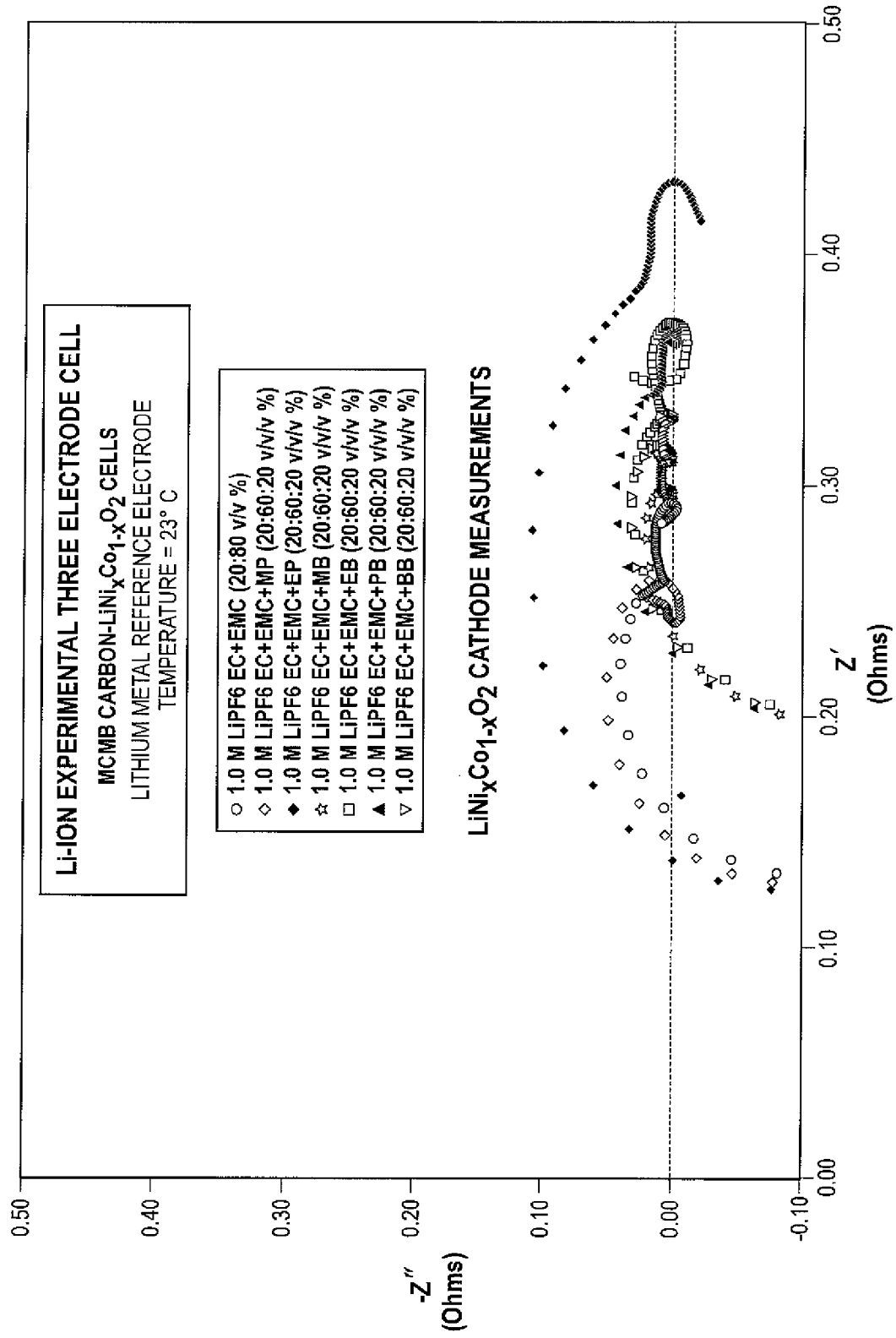
FIG. 16 is an illustration of a graph showing electrochemical impedance spectroscopy (EIS) measurements at 23° C. of $LiNi_xCo_{1-x}O_2$ electrodes from lithium ion cells containing electrolytes according to the invention.

FIG. 16 is an illustration of a graph showing electrochemical impedance spectroscopy (EIS) measurements at 23° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, M, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 17:
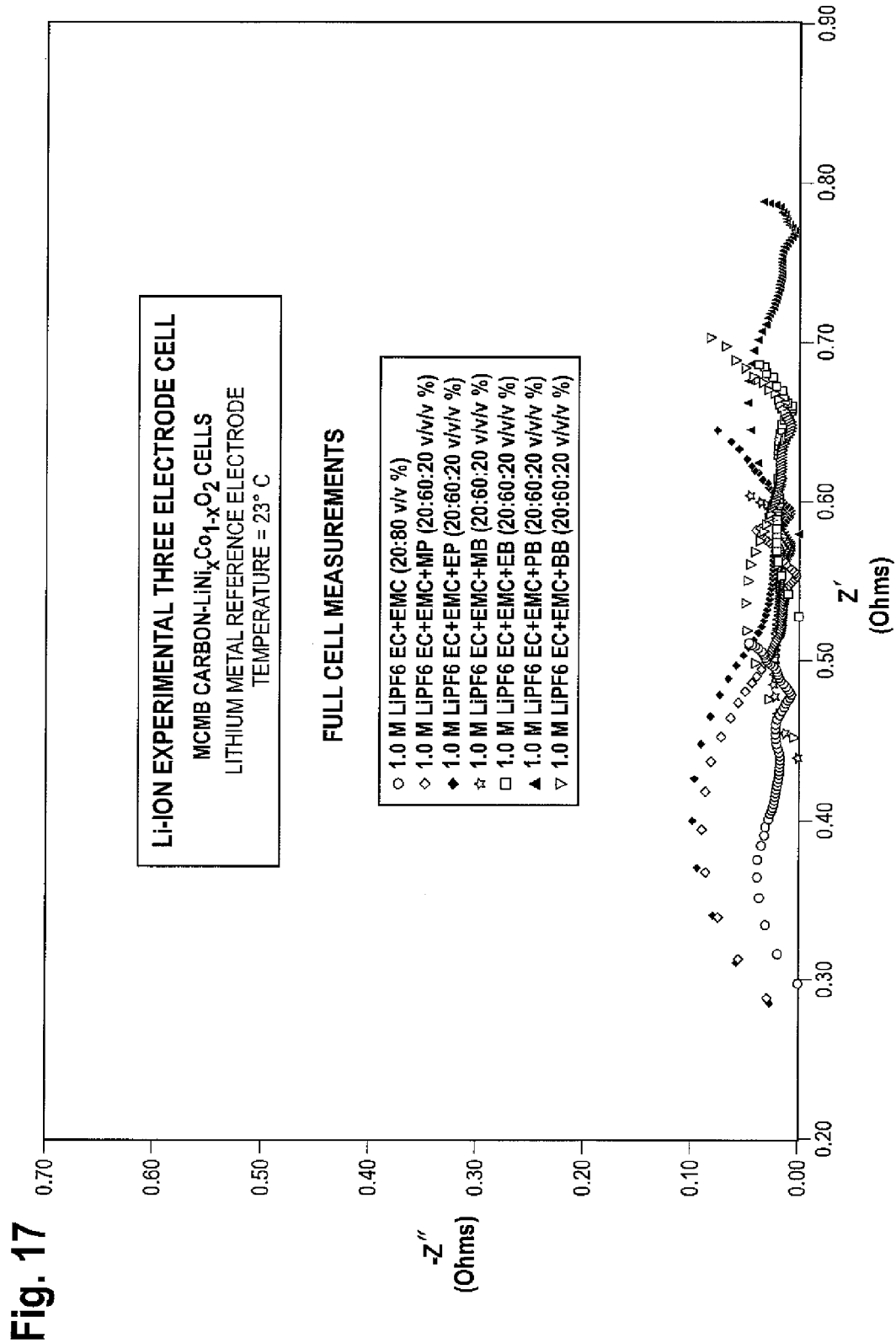
FIG. 17 is an illustration of a graph showing electrochemical impedance spectroscopy (EIS) measurements at 23° C. of lithium ion cells containing electrolytes according to the invention.

FIG. 17 is an illustration of a graph showing electrochemical impedance spectroscopy (EIS) measurements at 23° C. of lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$ and lithium metal reference electrode.

Figure 18:
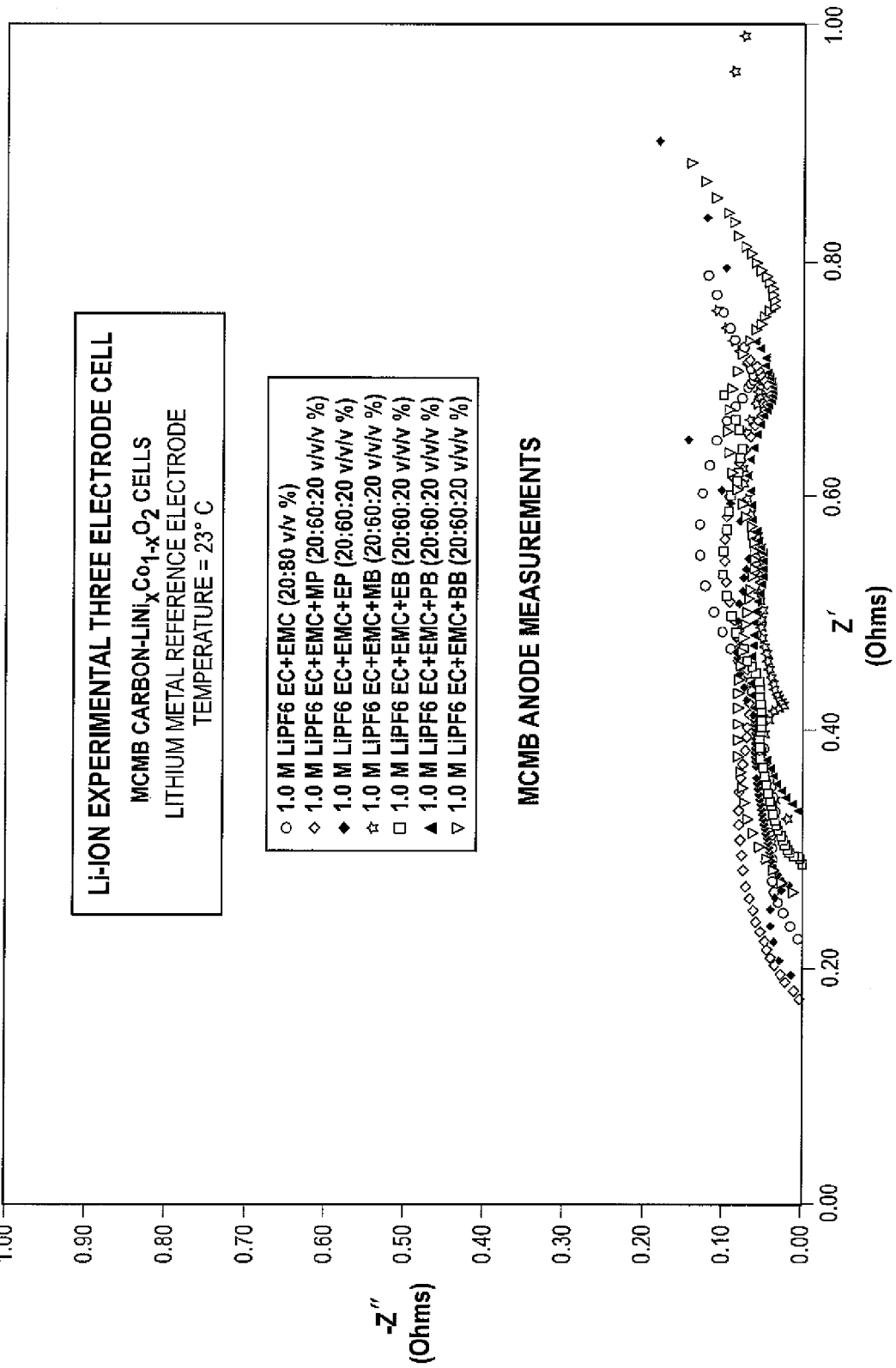
FIG. 18 is an illustration of a graph showing electrochemical impedance spectroscopy (EIS) measurements at 0° C. of MCMB electrodes from lithium ion cells containing electrolytes according to the invention.

FIG. 18 is an illustration of a graph showing electrochemical impedance spectroscopy (EIS) measurements at 0° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 19:
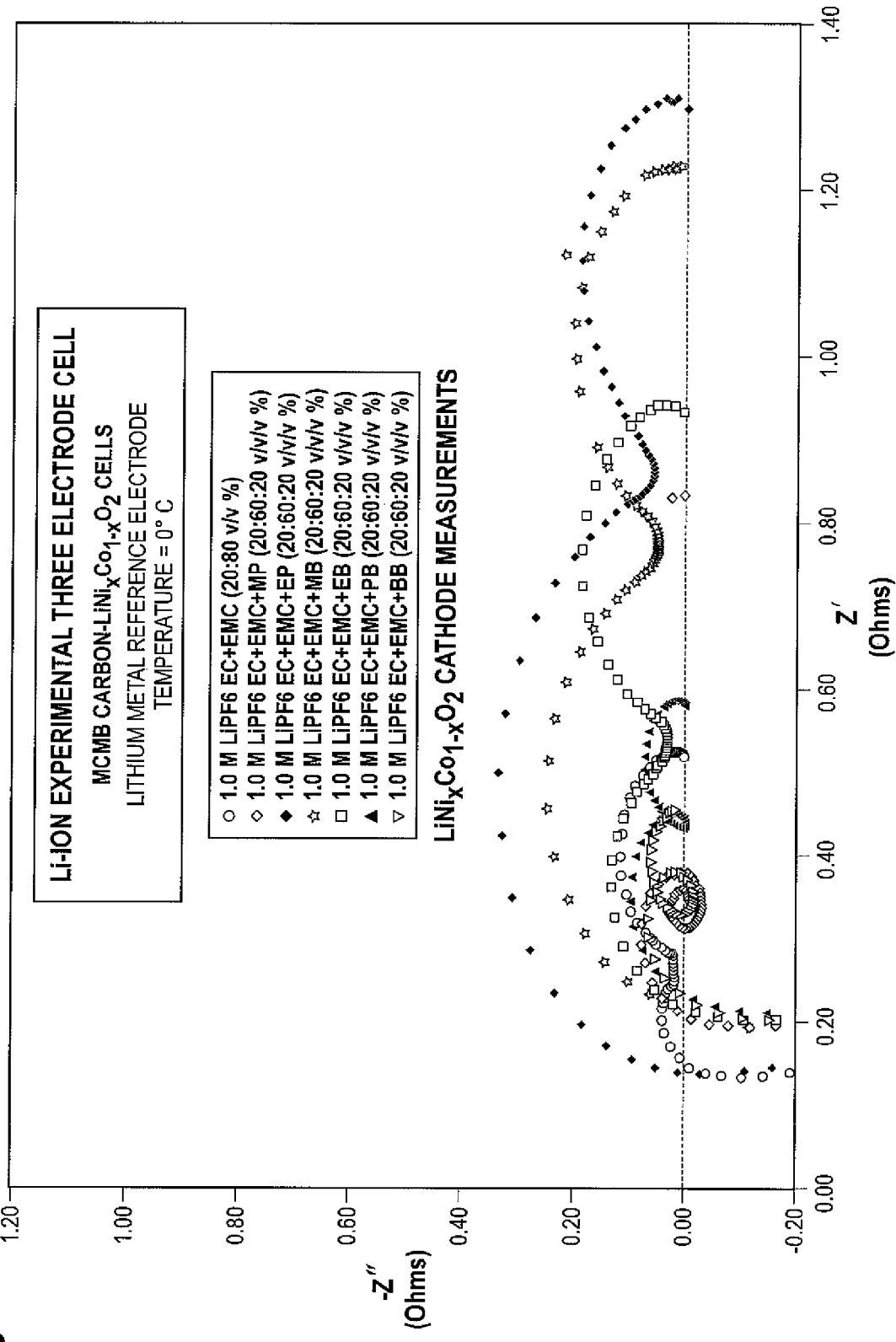
FIG. 19 is an illustration of a graph showing electrochemical impedance spectroscopy (EIS) measurements at 0° C. of $LiNi_xCo_{1-x}O_2$ electrodes from lithium ion cells containing electrolytes according to the invention.

FIG. 19 is an illustration of a graph showing electrochemical impedance spectroscopy (EIS) measurements at 0° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 20:
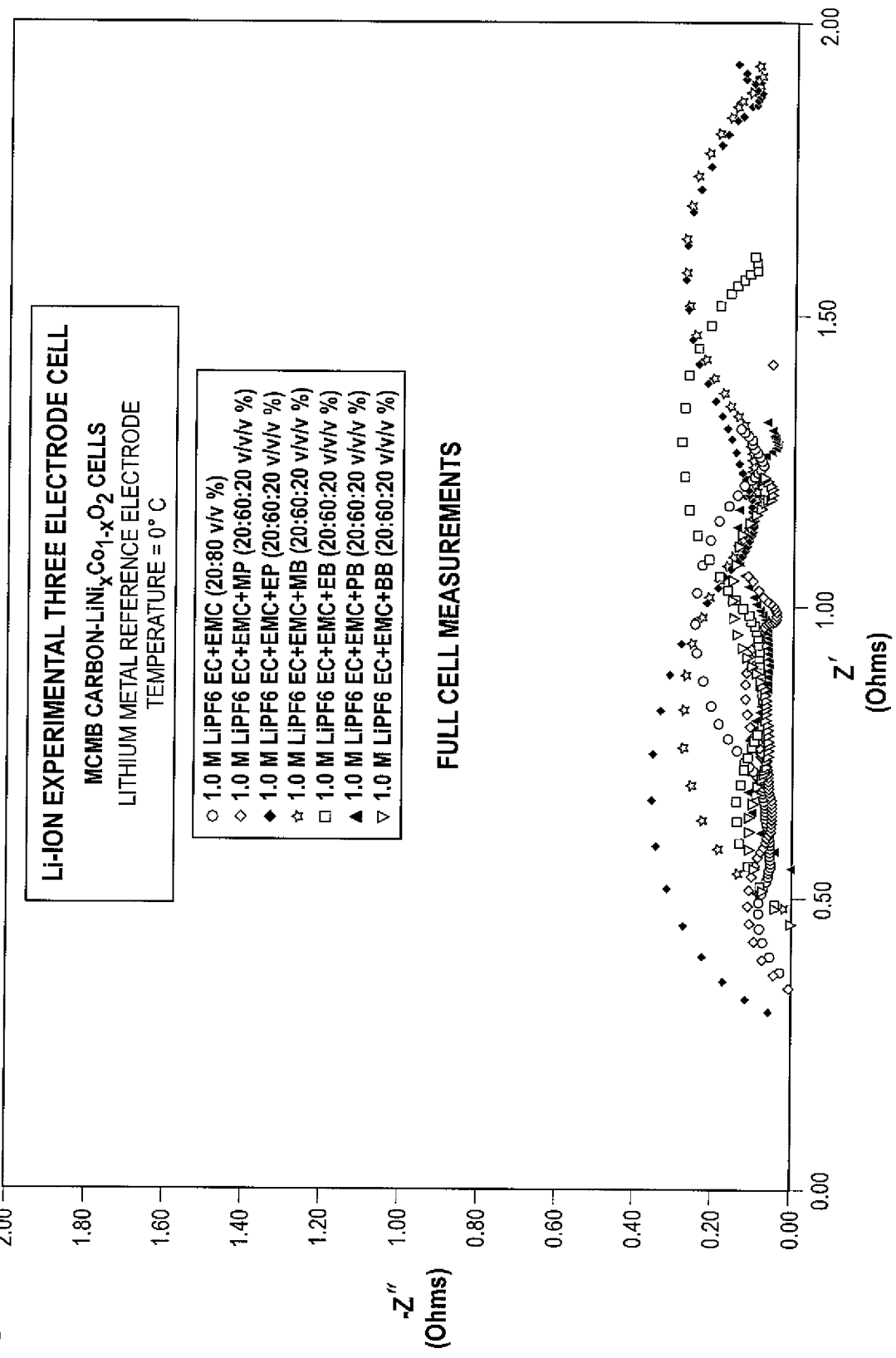
FIG. 20 is an illustration of a graph showing electrochemical impedance spectroscopy (EIS) measurements at 0° C. of lithium ion cells containing electrolytes according to the invention.

FIG. 20 is an illustration of a graph showing electrochemical impedance spectroscopy (EIS) measurements at 0° C. of lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 21:
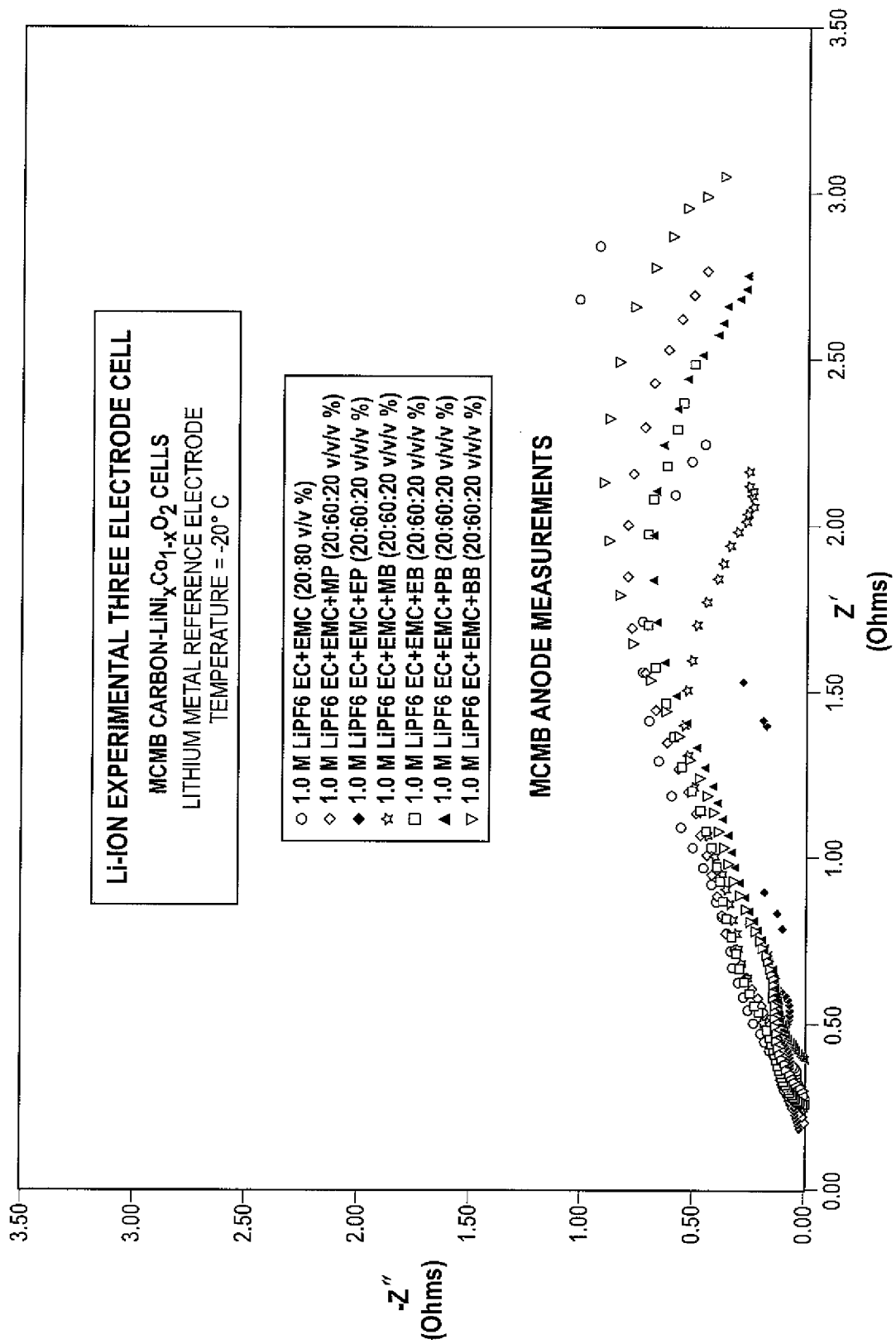
FIG. 21 is an illustration of a graph showing electrochemical impedance spectroscopy (EIS) measurements at −20° C. of MCMB electrodes from lithium ion cells containing electrolytes according to the invention.

FIG. 21 is an illustration of a graph showing electrochemical impedance spectroscopy (EIS) measurements at −20° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 22:
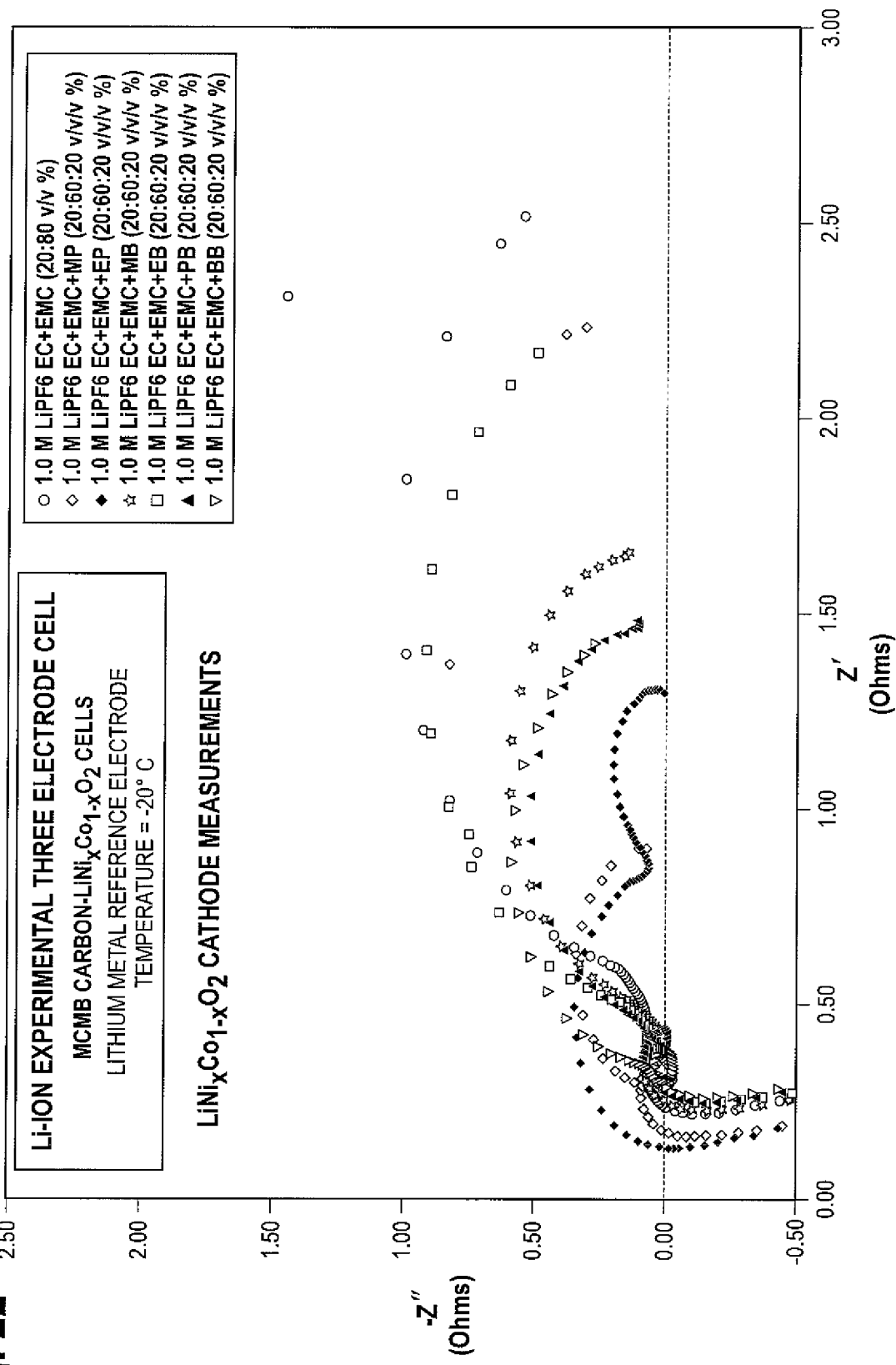
FIG. 22 is an illustration of a graph showing electrochemical impedance spectroscopy (EIS) measurements at −20° C. of $LiNi_xCo_{1-x}O_2$ electrodes from lithium ion cells containing electrolytes according to the invention.

FIG. 22 is an illustration of a graph showing electrochemical impedance spectroscopy (EIS) measurements at −20° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 23:
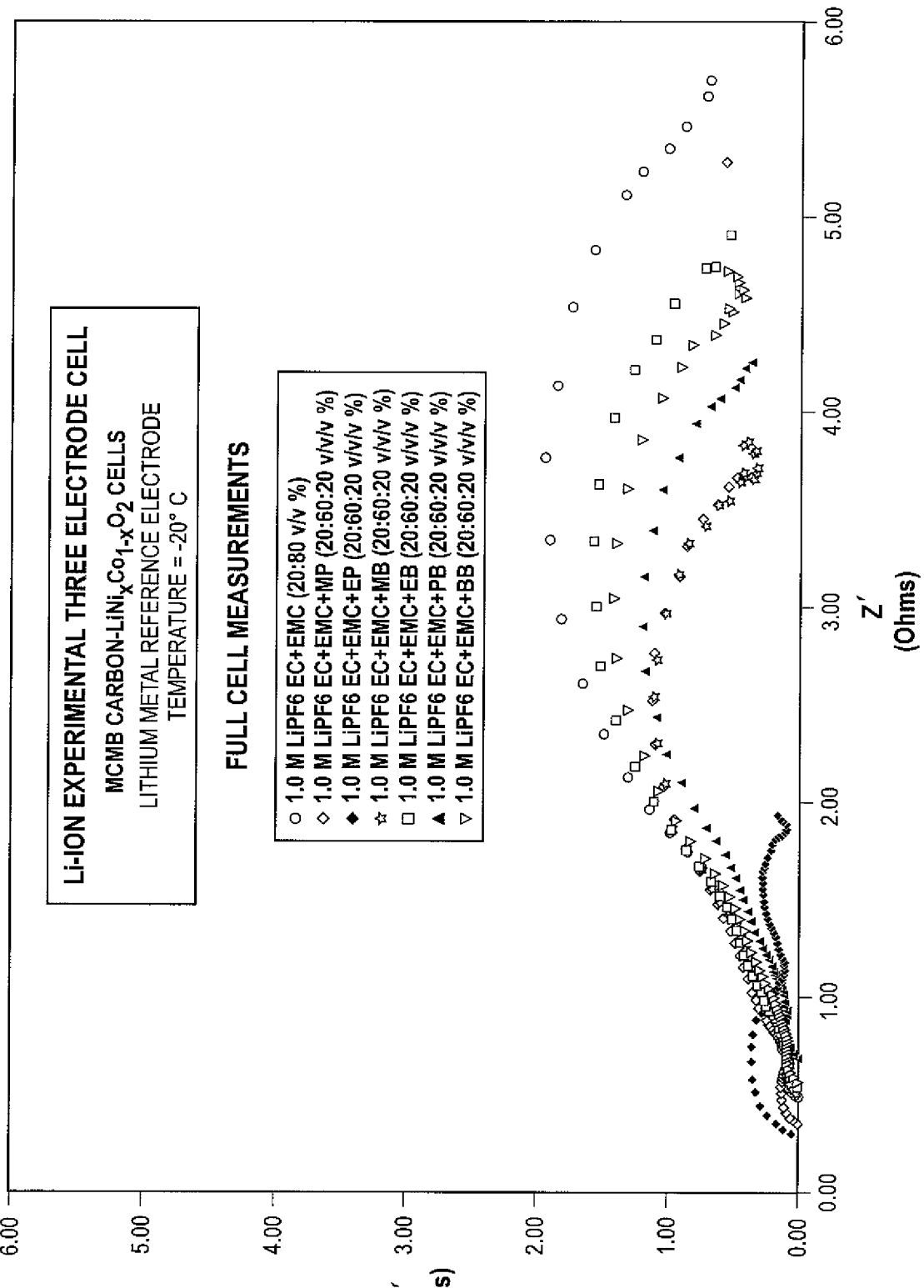
FIG. 23 is an illustration of a graph showing electrochemical impedance spectroscopy (EIS) measurements at −20° C. of lithium ion cells containing electrolytes according to the invention.

FIG. 23 is an illustration of a graph showing electrochemical impedance spectroscopy (EIS) measurements at −20° C. of lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows MCMB carbon-LiNi$_x$Co$_{1-x}$O$_2$ three electrode cells and lithium metal reference electrode.

Figure 24:
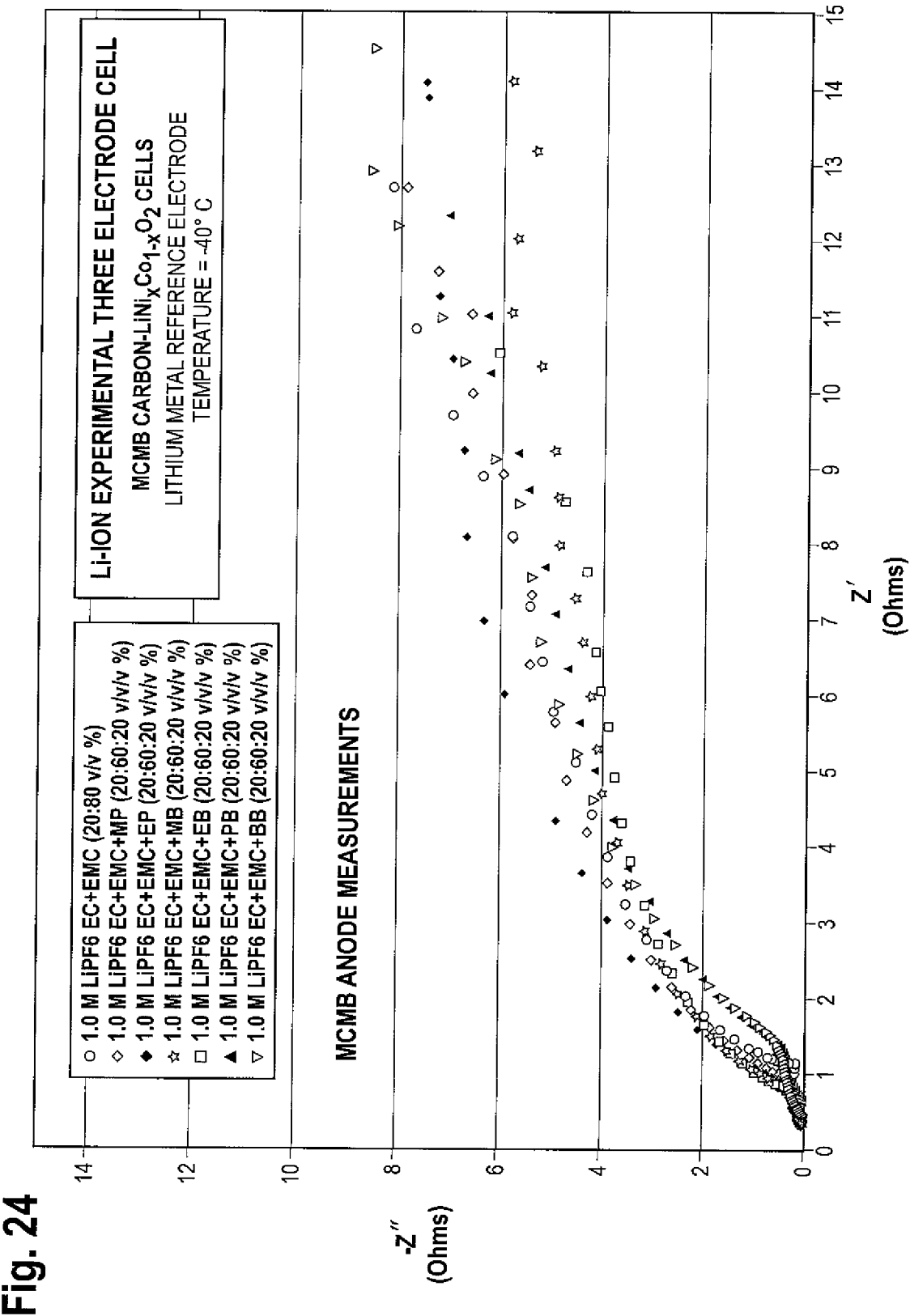
FIG. 24 is an illustration of a graph showing electrochemical impedance spectroscopy (EIS) measurements at −40° C. of MCMB electrodes from lithium ion cells containing electrolytes according to the invention.

FIG. 24 is an illustration of a graph showing electrochemical impedance spectroscopy (EIS) measurements at −40° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 25:
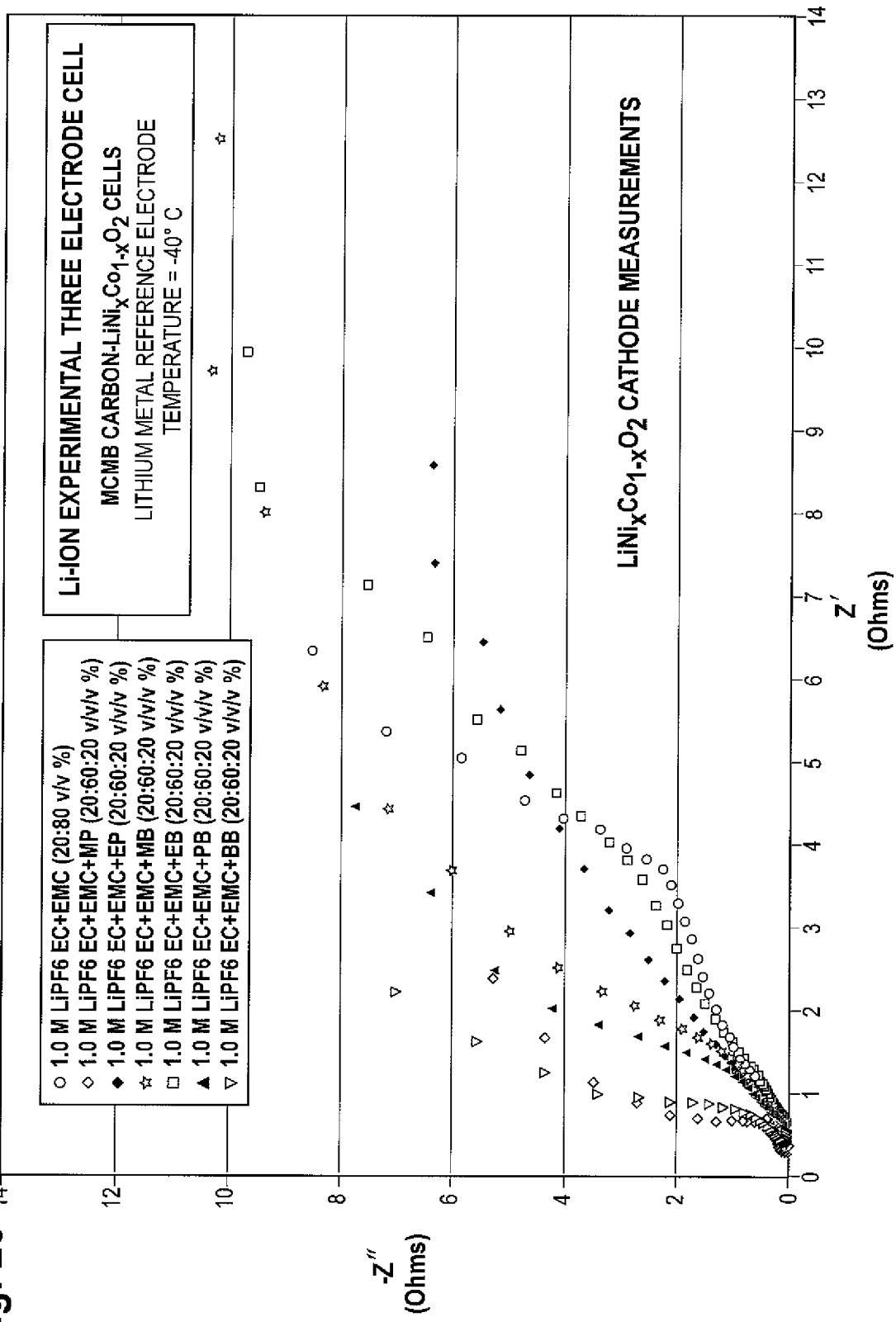
FIG. 25 is an illustration of a graph showing electrochemical impedance spectroscopy (EIS) measurements at −40° C. of $LiNi_xCo_{1-x}O_2$ electrodes from lithium ion cells containing electrolytes according to the invention.

FIG. 25 is an illustration of a graph showing electrochemical impedance spectroscopy (EIS) measurements at −40° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 26:
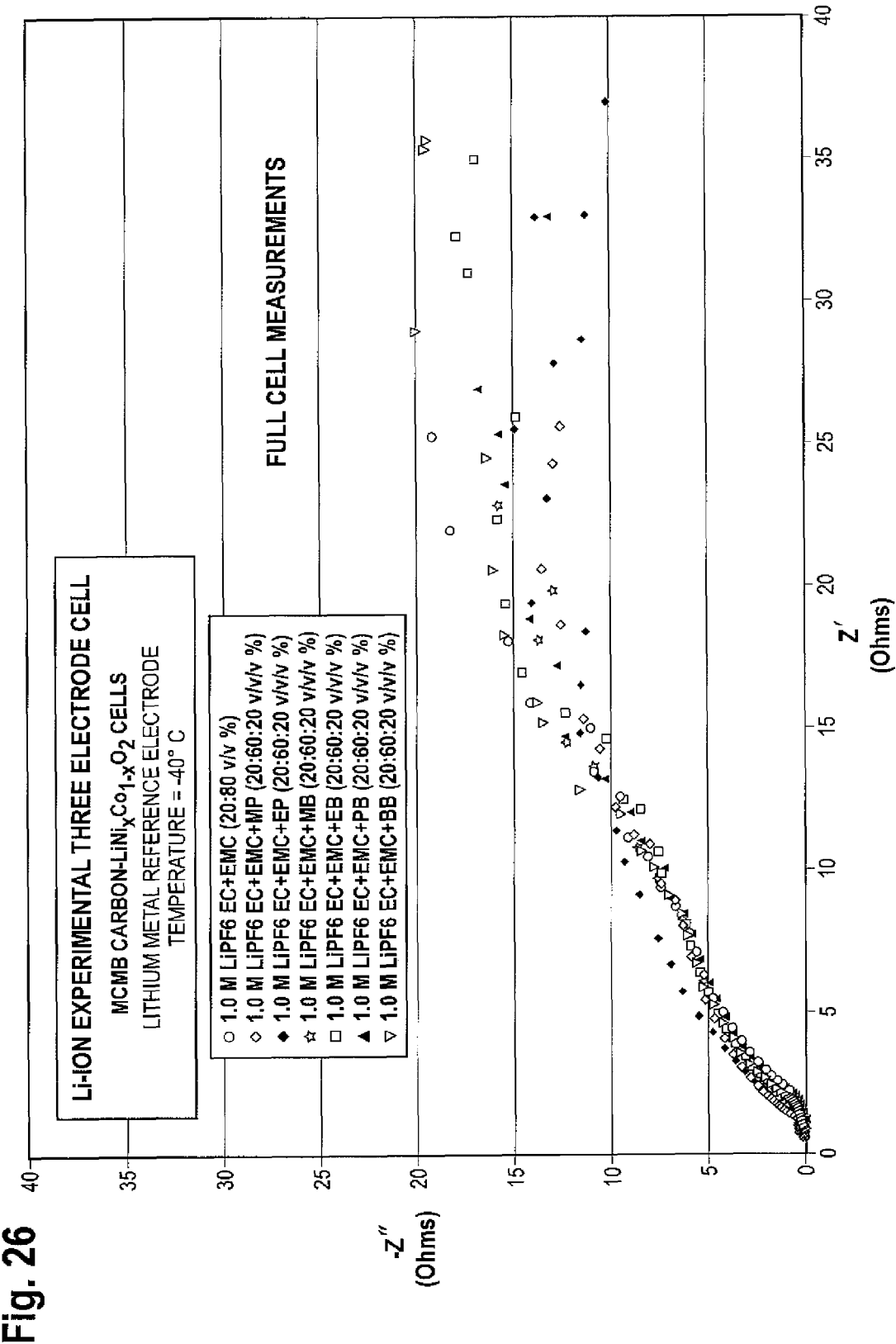
FIG. 26 is an illustration of a graph showing electrochemical impedance spectroscopy (EIS) measurements at −40° C. of lithium ion cells containing electrolytes according to the invention.

FIG. 26 is an illustration of a graph showing electrochemical impedance spectroscopy (EIS) measurements at −40° C. of lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 27:
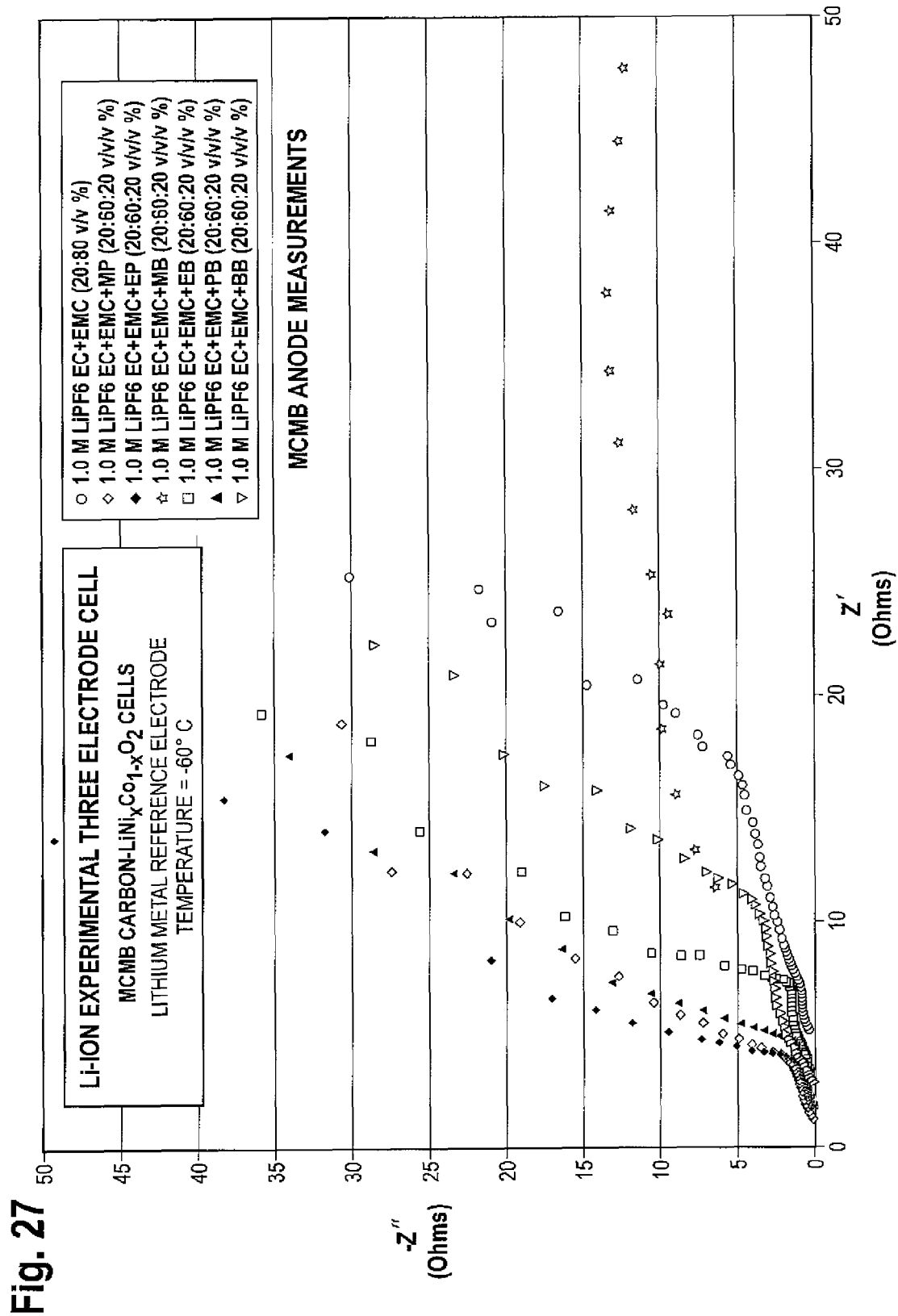
FIG. 27 is an illustration of a graph showing electrochemical impedance spectroscopy (EIS) measurements at −60° C. of MCMB electrodes from lithium ion cells containing electrolytes according to the invention.

FIG. 27 is an illustration of a graph showing electrochemical impedance spectroscopy (EIS) measurements at −60° C. of MCMB electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 28:
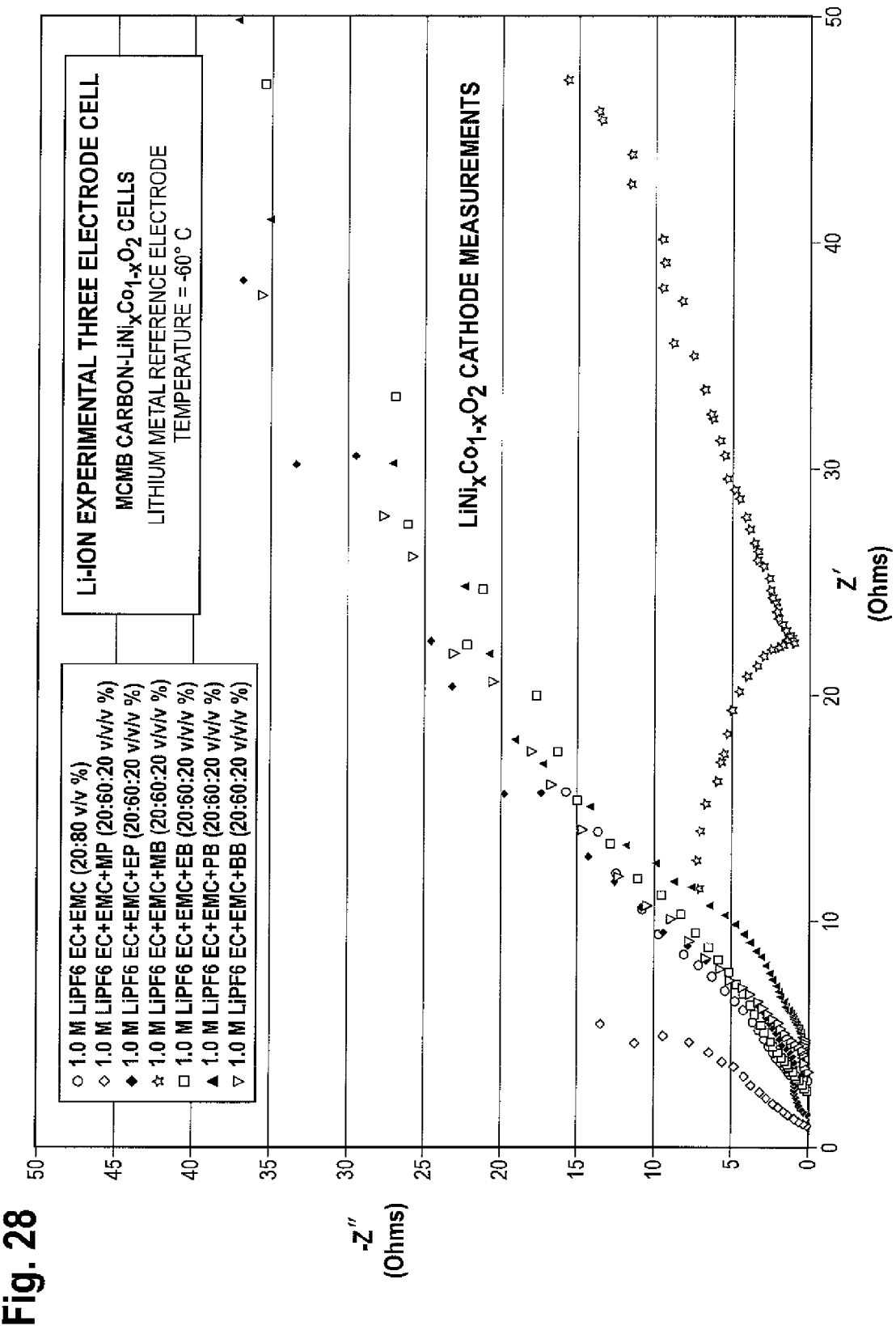
FIG. 28 is an illustration of a graph showing electrochemical impedance spectroscopy (EIS) measurements at −60° C. of $LiNi_xCo_{1-x}O_2$ electrodes from lithium ion cells containing electrolytes according to the invention.

FIG. 28 is an illustration of a graph showing electrochemical impedance spectroscopy (EIS) measurements at −60° C. of LiNi$_x$Co$_{1-x}$O$_2$ electrodes from lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Figure 29:
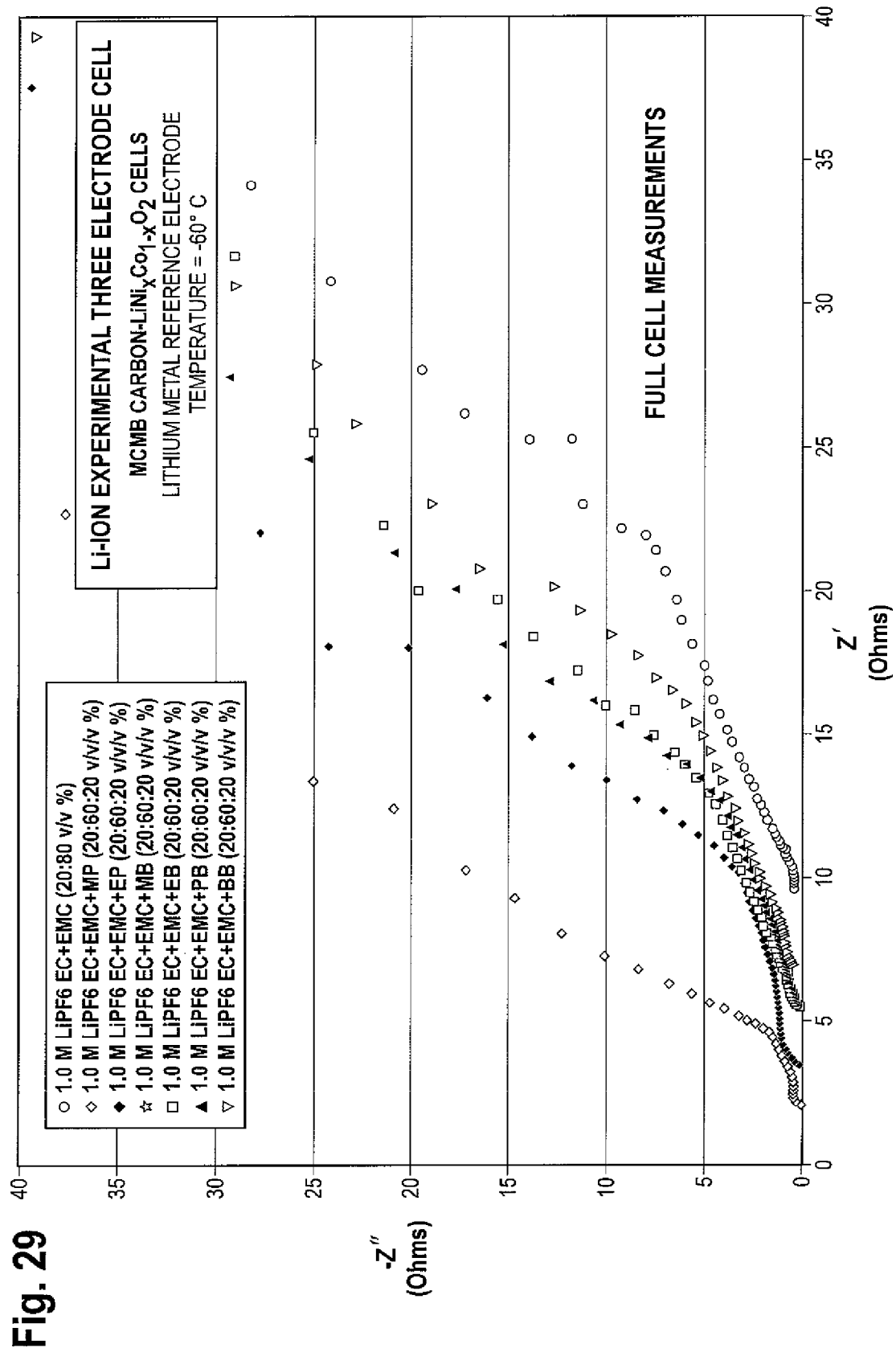
FIG. 29 is an illustration of a graph showing electrochemical impedance spectroscopy (EIS) measurements at −60° C. of lithium ion cells containing electrolytes according to the invention.

FIG. 29 is an illustration of a graph showing electrochemical impedance spectroscopy (EIS) measurements at −60° C. of lithium ion cells containing electrolytes according to the invention comprising 1.0M LiPF$_6$ EC+EMC+X (20:60:20 v/v %), where X=MP, EP, MB, EB, PB, and BB. The x-axis shows Z' (Ohms) and the y-axis shows −Z" (Ohms). The graph shows lithium ion experimental three electrode cells, MCMB carbon-LiNi$_x$Co$_{1-x}$O$_2$, and lithium metal reference electrode.

Prototype Cell Results

To evaluate the viability of the technology, three of the promising low temperature electrolytes were prepared at JPL (Jet Propulsion Laboratory) and shipped to Yardney Technical Products, Inc. for incorporation into large capacity (7 Ah (Amp-hour)) prototype lithium ion (Li-ion) cells. Yardney Technical Products, Inc. (also known as Lithion, Inc.) was the battery vendor for both the MSP'01 (Mars Surveyor Program 2001) Lander project and the 2003 MER (Mars Exploration Rover) mission or program. In addition, the cell chemistry selected for this study was nearly identical to that used for the cells/batteries fabricated for the two flight missions mentioned above, enabling a direct comparison. The electrolytes selected for incorporation into these cells were the following: (1) 1.0 M LiPF$_6$ EC+EMC+MP (20:60:20 v/v %), (2) 1.0 M LiPF$_6$ EC+EMC+EP (20:60:20 v/v %), and (3) and 1.0 M LiPF$_6$ EC+EMC+EB (20:60:20 v/v %). The results of these cells were compared with the results obtained with a number of cells that were fabricated with baseline all carbonate-based electrolytes, including the ternary mixture consisting of 1.0 M LiPF$_6$ EC+DEC+DMC (1:1:1 v/v %), which was previously developed and utilized on the MSP'01 Lander battery and the 2003 MER battery.

After the formation process at the vendor, the cells were subjected to conditioning cycling at various temperatures (20° C., 0° C., and −20° C.) to determine the reversible capacity, the specific energy, and the impedance of the cells. As illustrated in FIG. 30, the ester-based electrolytes resulted in cells with comparable capacity and specific energy to the baseline electrolyte-containing cells. FIG. 30 is an illustration of a table summary of conditioning cycling at 20° C. of prototype 7 Ah (Amp-hour) lithium ion cells containing electrolytes according to the invention comprising 1.0M LiPF$_6$ EC+EMC+X (20:60:20 v/v %), where X=MP, EP, MB, EB, PB, and BB, as well as cells with baseline all carbonate-based electrolytes.

Figure 31:
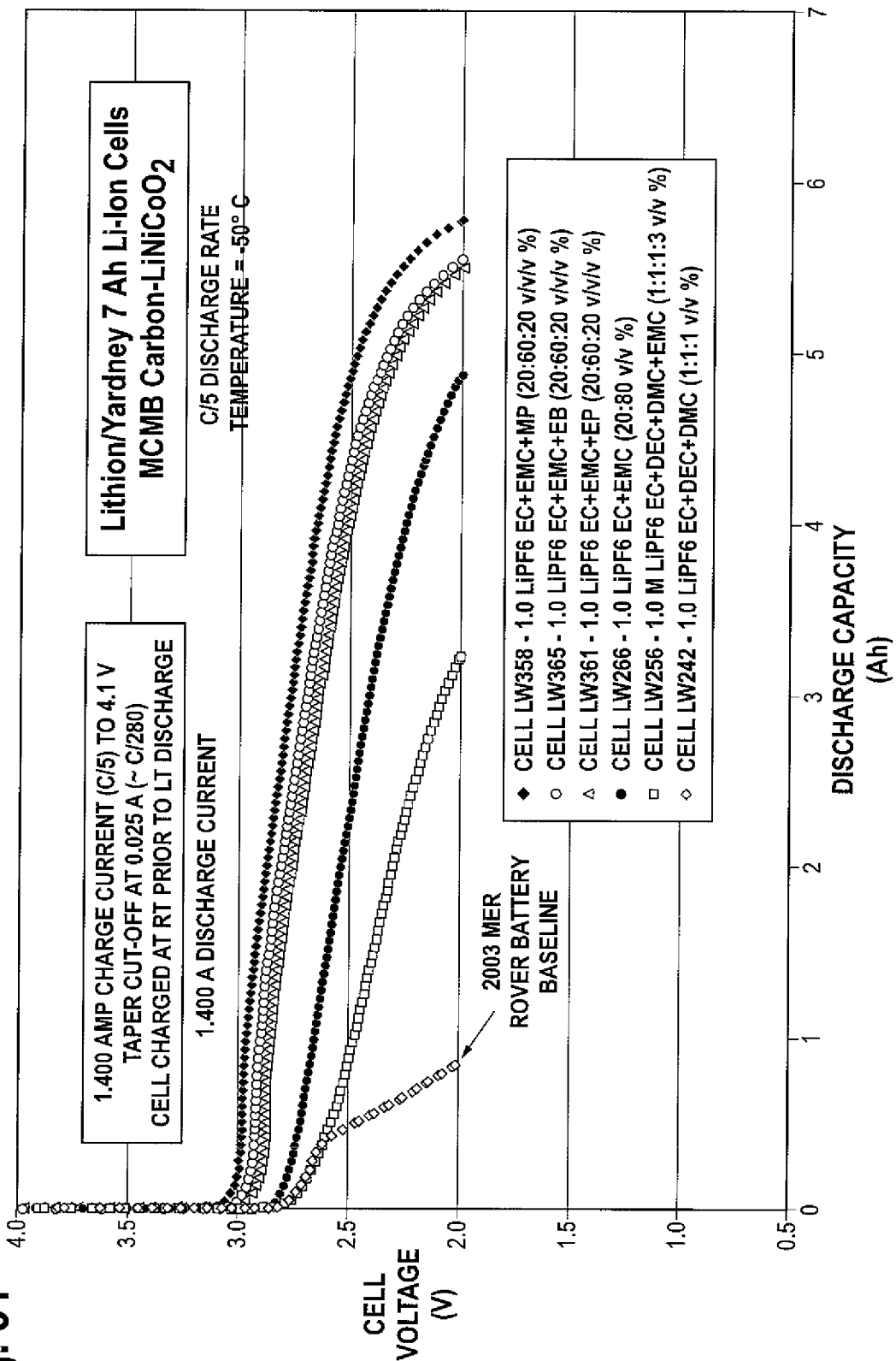
FIG. 31 is an illustration of a graph showing discharge capacity at −50° C., using a C/5 rate, of prototype 7 Ah lithium ion cells containing electrolytes according to the invention.

After completing the conditioning cycling, the cells were subjected to low temperature discharge rate characterization testing. As shown in FIG. 31, when the cells were discharged at −50° C. using a fairly aggressive discharge rate (C/5, or 1.40 A), the cell containing the methyl propionate-based electrolyte delivered the highest capacity, yielding 5.78 Ah, which corresponded to 72.3% of the room temperature capacity. FIG. 31 is an illustration of a graph showing discharge capacity (Ah) at −50° C., using a C/5 rate, of prototype 7 Ah lithium ion cells containing electrolytes according to the invention comprising 1.0M LiPF$_6$ EC+EMC+X (20:60:20 v/v %), where X=MP, EP, MB, EB, PB, and BB, as well as cells with baseline all carbonate-based electrolytes. The x-axis shows discharge capacity (Ah (Amp-hour)) and the y-axis shows cell voltage (V). This represented over a six-fold improvement over the baseline electrolyte (the ternary carbonate mixture), which yielded only 0.84 Ah, or 10.4% of the room temperature capacity.

Figure 32:
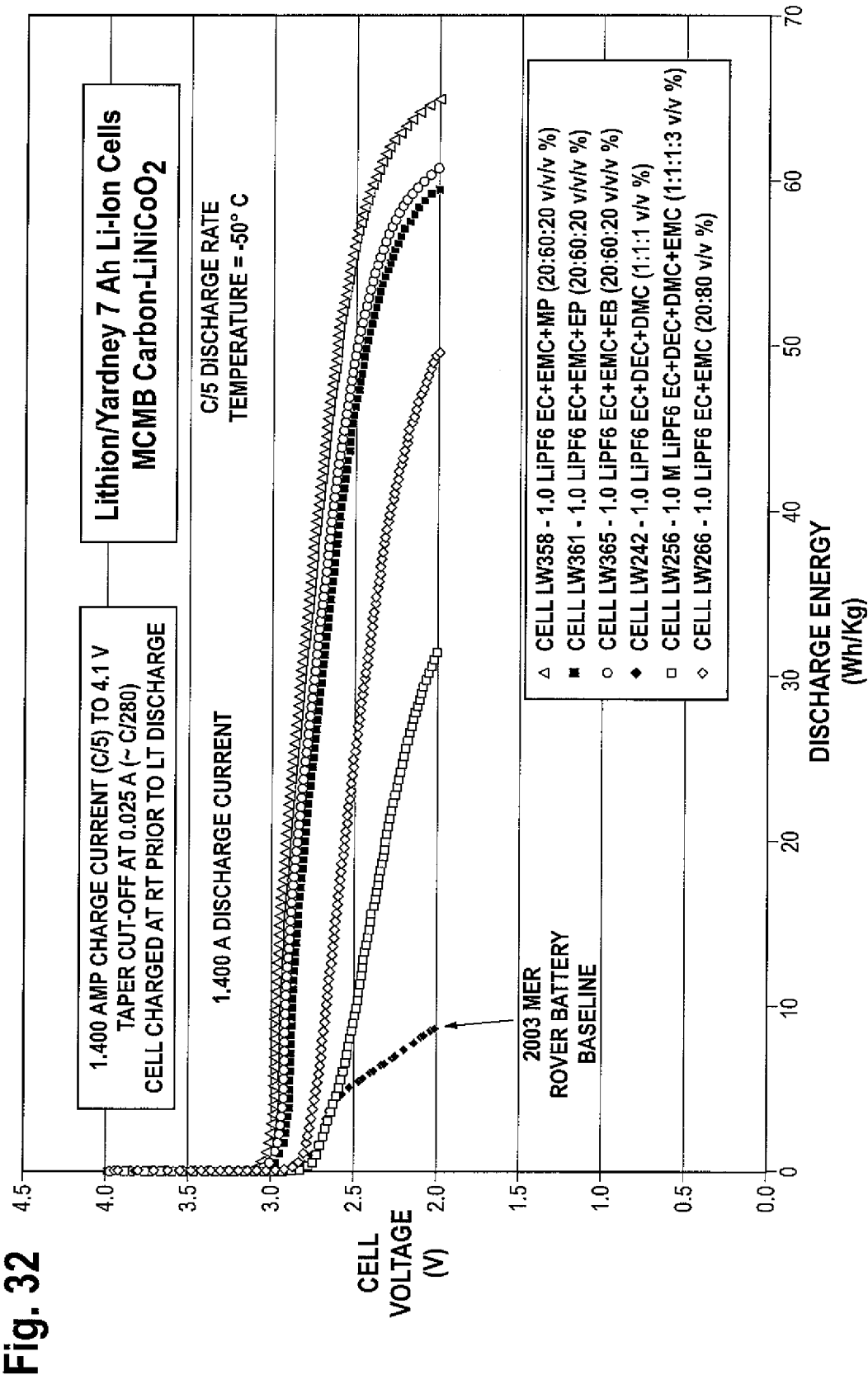
FIG. 32 is an illustration of a graph showing discharge energy (Wh/kg—Watt hour per kilogram) at −50° C., using a C/5 rate, of prototype 7 Ah lithium ion cells containing electrolytes according to the invention.

When the cells were compared with respect to the specific energy, as shown in FIG. 32, the cell containing the methyl propionate-based electrolyte delivered 65.0 Wh/kg (Watt hour per kilogram) and the cells containing the ethyl propionate and ethyl butyrate-based electrolytes were observed to give ~60 Wh/kg under these conditions. In contrast, the baseline cell delivered only 8.6 Wh/kg. FIG. 32 is an illustration of a graph showing discharge energy (Wh/kg) at −50° C., using a C/5 rate, of prototype 7 Ah lithium ion cells containing electrolytes according to the invention comprising 1.0M LiPF$_6$ EC+EMC+X (20:60:20 v/v %), where X=MP, EP, MB, EB, PB, and BB, as well as cells with baseline all carbonate-based electrolytes. The x-axis shows discharge energy (Wh/kg) and the y-axis shows cell voltage (V).

Figure 33:
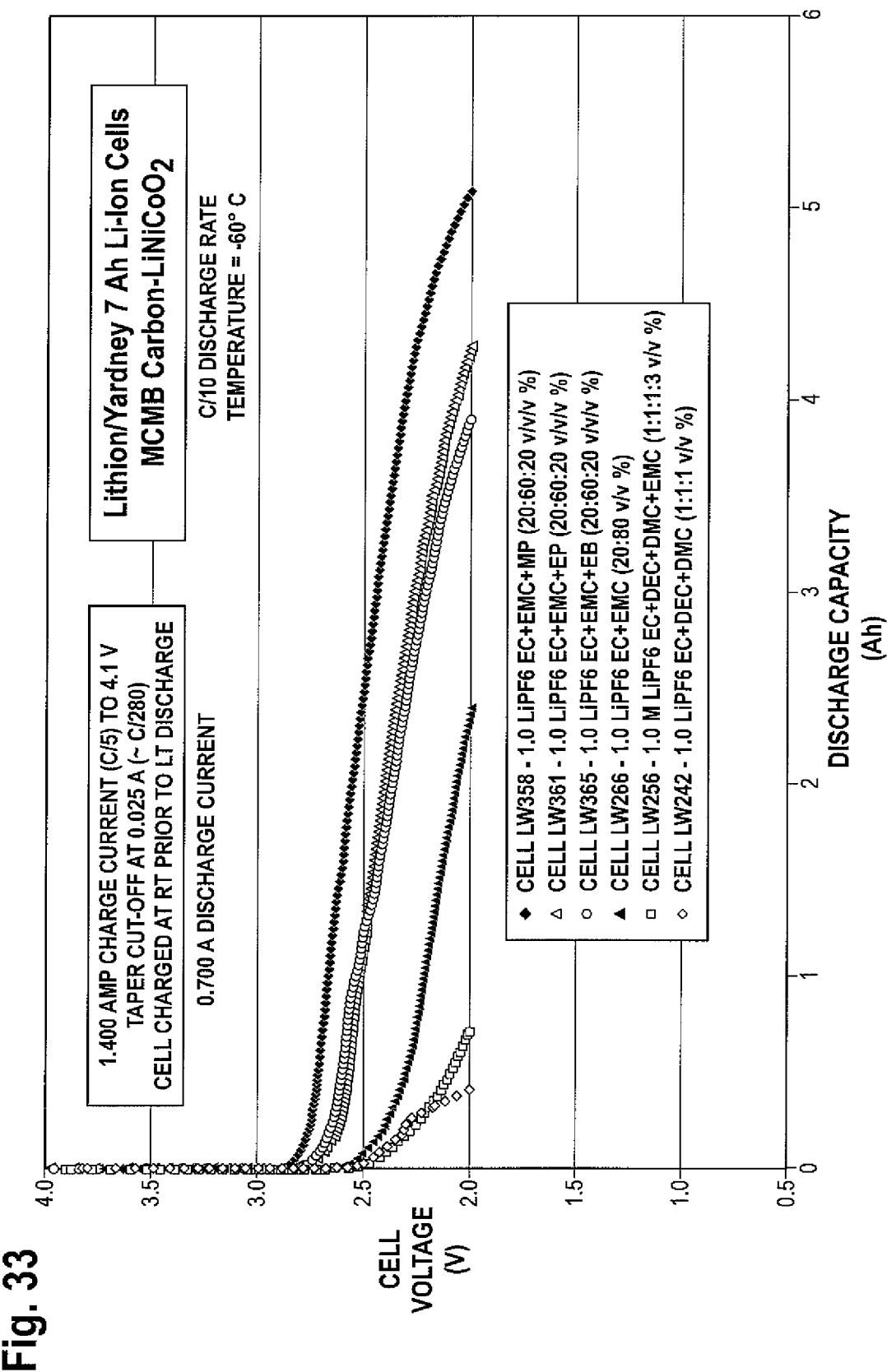
FIG. 33 is an illustration of a graph showing discharge energy (Ah) at −60° C., using a C/10 rate, of prototype 7 Ah lithium ion cells containing electrolytes according to the invention.

When the cells were evaluated at −60° C. using a C/10 discharge rate, as shown in FIG. 33, the same trend was observed with the ester-containing electrolytes outperforming the baseline all carbonate-based blends, expressed in terms of decreasing capacity: EC+EMC+MP (5.08 Ah)>EC+EMC+EP (4.27 Ah)>EC+EMC+EB (3.89 Ah)>EC+EMC (2.40 Ah)>EC+DEC+DMC+EMC (0.71 Ah)>EC+DEC+DMC (0.41 Ah). FIG. 33 is an illustration of a graph showing discharge capacity (Ah) at −60° C., using a C/10 rate, of prototype 7 Ah lithium ion cells containing electrolytes according to the invention comprising 1.0M LiPF$_6$ EC+EMC+X (20:60:20 v/v %), where X=MP, EP, MB, EB, PB, and BB, as well as cells with baseline all carbonate-based electrolytes. The x-axis shows discharge capacity (Ah) and the y-axis shows cell voltage (C).

SUMMARY

In summary, lithium ion ester and carbonate-based blended electrolytes resulted in improved discharge performance and rate capability at low temperatures (down to −60° C.). More specifically, improved performance with multi-component electrolytes of the following composition was demonstrated: 1.0 M LiPF$_6$ in ethylene carbonate (EC)+ethyl methyl carbonate (EMC)+X (20:60:20 v/v %) [where X is methyl propionate (MP), ethyl propionate (EP), methyl butyrate (MB), ethyl butyrate (EB), propyl butyrate (PB), or butyl butyrate (BB)]. A number of these electrolytes were demonstrated in both experimental as well as aerospace quality high capacity prototype cells. As shown, a prototype cell containing the 1.0 M LiPF$_6$ EC+EMC+MP (20:60:20 v/v %) electrolyte was capable of delivering over 6 (six) times the amount of capacity delivered by the baseline ternary all carbonate blend, and was able to support reasonably aggressive rates at low temperature (−50° C. and −60° C.). Cells containing the other esters also performed well at low temperature, with the lower molecular weight, lower viscosity cosolvents generally yielding better performance at low temperatures. Although slightly less favorable in terms of electrolyte conductivity, the higher molecular weight esters (e.g., propyl butyrate (PB), and butyl butyrate (BB)) were expected to result in cells with more favorable high temperature resilience (>40° C.) compared to the lower molecular weight esters.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An electrolyte for use in a lithium ion electrochemical cell, the electrolyte consisting of a mixture of:
   20% by volume ethylene carbonate (EC);
   60% by volume ethyl methyl carbonate (EMC);
   20% by volume of an ester cosolvent selected from the group consisting of methyl propionate (MP), methyl butyrate (MB), ethyl butyrate (EB), propyl butyrate (PB) and butyl butyrate (BB); and
   a lithium salt.

2. The electrolyte of claim 1 wherein the ester cosolvent is selected from the group consisting of methyl butyrate (MB), ethyl butyrate (EB), propyl butyrate (PB) and butyl butyrate (BB).

3. The electrolyte of claim 1 wherein the ester cosolvent is methyl propionate (MP).

4. The electrolyte of claim 1 wherein the lithium salt is in a concentration of from about 0.5 Molar to about 1.4 Molar.

5. The electrolyte of claim 1 wherein the lithium salt is selected from the group consisting of lithium hexafluorophosphate ($LiPF_6$), lithium tetrafluoroborate ($LiBF_4$), lithium bis(oxalato) borate (LiBOB), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), and mixtures thereof.

6. A lithium ion electrolyte for use in a lithium ion electrochemical cell, the lithium ion electrolyte consisting of a mixture of:
   ethylene carbonate (EC);
   ethyl methyl carbonate (EMC);
   an ester cosolvent, wherein the ester solvent is selected from the group consisting of methyl propionate (MP), methyl butyrate (MB), propyl butyrate (PB) and butyl butyrate (BB), and,
   a lithium salt in a concentration of from about 0.5 Molar to about 1.4 Molar,
   wherein the lithium salt is selected from the group consisting of lithium hexafluorophosphate ($LiPF_6$), lithium tetrafluoroborate ($LiBF_4$), lithium bis(oxalato) borate (LiBOB), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), and mixtures thereof
   wherein the amount of EC is 20% by volume, the amount of EMC is 60% by volume and the amount of ester cosolvent is 20% by volume.

7. The lithium ion electrolyte of claim 6 wherein the ester cosolvent is selected from the group consisting of methyl butyrate (MB), ethyl butyrate (EB), propyl butyrate (PB) and butyl butyrate (BB).

8. The lithium ion electrolyte of claim 6 wherein the ester cosolvent is methyl propionate (MP).

9. A lithium ion electrochemical cell comprising:
   an anode;
   a cathode; and
   the electrolyte of claim 6 interspersed between the anode and the cathode wherein the electrochemical cell operates in a temperature range of from about −60 degrees Celsius to about 60 degrees Celsius.

10. The lithium ion electrochemical cell of claim 9 wherein the ester cosolvent is selected from the group consisting of methyl butyrate (MB), ethyl butyrate (EB), propyl butyrate (PB) and butyl butyrate (BB).

11. The lithium ion electrochemical cell of claim 9 wherein the ester cosolvent is methyl propionate (MP).

12. A lithium ion electrochemical cell comprising:
   an anode;
   a cathode;
   an electrolyte interspersed between the anode and the cathode, wherein the electrolyte consists of a mixture of:
   20% by volume ethylene carbonate (EC);
   60% by volume ethyl methyl carbonate (EMC);
   20% by volume of an ester cosolvent selected from the group consisting of methyl propionate (MP), methyl butyrate (MB), ethyl butyrate (EB), propyl butyrate (PB), and butyl butyrate (BB); and,
   a lithium salt,
   wherein the electrochemical cell operates in a temperature range of from about −60 degrees Celsius to about 60 degrees Celsius.

13. The lithium ion electrochemical cell of claim 12 wherein the anode is selected from the group consisting of mesocarbon microbeads (MCMB) carbon, lithium titanate ($Li_4Ti_5O_{12}$), carbon graphite, coke based carbon, and lithium metal.

14. The lithium ion electrochemical cell of claim 12 wherein the cathode is selected from the group consisting of lithium cobalt oxide ($LiCoO_2$), lithium nickel cobalt oxide ($LiNi_{0.8}Co_{0.2}O_2$), lithium manganese oxide ($LiMn_2O_4$), lithium nickel cobalt aluminum oxide ($LiNiCoAlO_2$), lithium metal phosphate ($LiMPO_4$) wherein the metal M is selected from the group consisting of iron, cobalt and manganese and lithium nickel cobalt manganese oxide ($LiNiCoMnO_2$).

15. The lithium ion electrochemical cell of claim 12 wherein the lithium salt is selected from the group consisting of lithium hexafluorophosphate ($LiPF_6$), lithium ($LiBF_4$), lithium bis(oxalato) borate (LiBOB), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), and mixtures thereof.

16. The lithium ion electrochemical cell of claim 12 wherein the ester cosolvent is selected from the group consisting of methyl butyrate (MB), ethyl butyrate (EB), propyl butyrate (PB) and butyl butyrate (BB).

17. The lithium ion electrochemical cell of claim 12 wherein the ester solvent is methyl propionate (MP).

* * * * *